(12) United States Patent
Yang et al.

(10) Patent No.: US 12,739,828 B2
(45) Date of Patent: Sep. 15, 2026

(54) METHOD AND DEVICE FOR TRANSMITTING AND RECEIVING SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 330 days.

(21) Appl. No.: 18/696,180

(22) PCT Filed: Sep. 28, 2022

(86) PCT No.: PCT/KR2022/014531

§ 371 (c)(1),
(2) Date: Mar. 27, 2024

(87) PCT Pub. No.: WO2023/055061

PCT Pub. Date: Apr. 6, 2023

(65) Prior Publication Data

US 2024/0389097 A1 Nov. 21, 2024

Related U.S. Application Data

(60) Provisional application No. 63/286,079, filed on Dec. 5, 2021.

(30) Foreign Application Priority Data

Sep. 30, 2021 (KR) ........................ 10-2021-0130228

(51) Int. Cl.
*H04W 72/1268* (2023.01)
*H04W 72/21* (2023.01)
(Continued)

(52) U.S. Cl.
CPC ....... *H04W 72/1268* (2013.01); *H04W 72/21* (2023.01); *H04W 72/231* (2023.01); *H04W 72/566* (2023.01)

(58) Field of Classification Search
CPC ............. H04W 72/21; H04W 72/1268; H04W 72/231; H04W 72/566; H04L 1/1854
See application file for complete search history.

(56) References Cited

U.S. PATENT DOCUMENTS

2019/0357178 A1* 11/2019 Bae ....................... H04L 5/0044
2020/0314820 A1* 10/2020 Kim ...................... H04L 5/0058
(Continued)

FOREIGN PATENT DOCUMENTS

WO WO2020/006678 1/2020

OTHER PUBLICATIONS

CN-107432015-A, Takeda et al., User Terminal, Wireless Base station, and Wireless communication method (Year: 2017).*
(Continued)

*Primary Examiner* — Mong-Thuy T Tran
(74) *Attorney, Agent, or Firm* — Fish & Richardson P.C.

(57) ABSTRACT

A UE according to an embodiment of the present disclosure may receive a parameter enabling simultaneous transmission of overlapping PUCCH-PUSCH having different priorities in the same PUCCH cell group, and may perform uplink (UL) transmission related to a PUCCH and one or at least two PUSCHs overlapping the PUCCH. The one or at least two PUSCHs may include at least one of a first PUSCH on a first band to which a cell of the PUCCH belongs and a second PUSCH on a second band. The UE may perform the UL transmission without multiplexing the UCI of the PUCCH onto the second PUSCH on the basis of the first band and the second band being different from each other.

15 Claims, 11 Drawing Sheets

(51) Int. Cl.
*H04W 72/231* (2023.01)
*H04W 72/566* (2023.01)

(56) References Cited

U.S. PATENT DOCUMENTS

| | | | | |
|---|---|---|---|---|
| 2021/0105126 | A1* | 4/2021 | Yi | H04W 76/27 |
| 2021/0243779 | A1 | 8/2021 | Takeda et al. | |
| 2021/0258993 | A1 | 8/2021 | Takeda et al. | |
| 2022/0085925 | A1* | 3/2022 | Gao | H04L 5/0053 |
| 2022/0225360 | A1* | 7/2022 | Yi | H04W 72/21 |
| 2023/0105294 | A1* | 4/2023 | Park | H04L 5/0053<br>370/329 |
| 2023/0354404 | A1* | 11/2023 | Li | H04L 1/1671 |
| 2024/0357633 | A1* | 10/2024 | Takahashi | H04W 72/12 |

OTHER PUBLICATIONS

CATT, "Discussion on overlapping between CG PUSCH and DG PUSCH," 3GPP TSG RAN WG1, Meeting #105-e, R1-2104479, e-Meeting, May 10-27, 2021, 10 pages.
International Search Report and Written Opinion in International Appln. No. PCT/KR2022/014531, mailed on Jan. 12, 2023, 13 pages (with English translation).
Nokia, "Summary of [Post-106-e-Rel17-RRC-03] Enhanced IIoT and URLLC," 3GPP TSG-RAN WG1, Meeting #106-e, R1-2108680, e-Meeting, Aug. 16-27, 2021, 39 pages.

* cited by examiner

FIG. 9

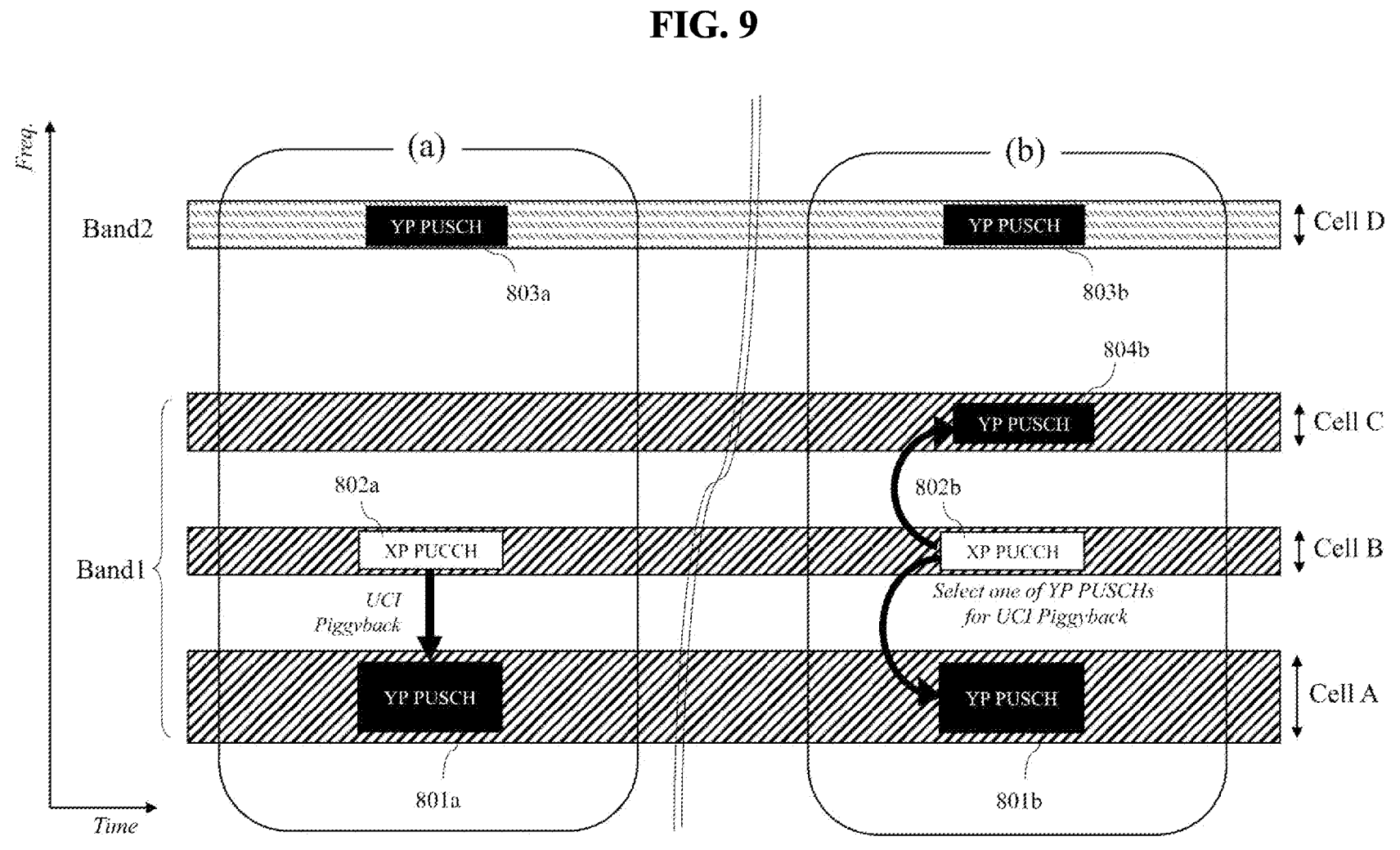

(a)
(b)
Cell D
Cell C
Cell B
Cell A
YP PUSCH
803a
803b
XP PUCCH
802a
802b
801a
801b
804b
UCI Piggyback
Select one of YP PUSCHs for UCI Piggyback
Band2
Band1
Time
Freq.

METHOD AND DEVICE FOR TRANSMITTING AND RECEIVING SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2022/014531, filed on Sep. 28, 2022, which claims the benefit of U.S. Provisional Application No. 63/286,079, filed on Dec. 5, 2021, and Korean Application No. 10-2021-0130228, filed on Sep. 30, 2021. The disclosures of the prior applications are incorporated by reference in their entirety.

TECHNICAL FIELD

The present disclosure relates to a wireless communication system, and more particularly, to a method and apparatus for transmitting or receiving a downlink/uplink radio signal in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of transmitting a signal by a user equipment (UE) in a wireless communication system. The method may include: receiving a parameter related to simultaneous physical uplink control channel—physical uplink shared channel (PUCCH-PUSCH) transmission; and performing an uplink (UL) transmission related to at least one of a PUCCH and one or more PUSCHs overlapping with the PUCCH. The parameter related to the PUCCH-PUSCH simultaneous transmission may be a parameter for enabling a simultaneous transmission of overlapping PUCCH-PUSCH with different priorities within a same PUCCH cell group. The one or more PUSCHs overlapping with the PUCCH may include at least one of a first PUSCH on a first band to which a cell of the PUCCH belongs and a second PUSCH on a second band having at least one cell. In a state where the simultaneous transmission of the overlapping PUCCH-PUSCH has been enabled, the UE performs the UL transmission without multiplexing uplink control information (UCI) of the PUCCH into the second PUSCH, based on that the first band to which the cell of the PUCCH belongs is different from the second band to which the cell of the second PUSCH belongs.

A priority of the PUCCH may be different from a priority of the second PUSCH. The cell of the PUCCH and the cell of the second PUSCH may belong to the same PUCCH cell group. The PUCCH and the second PUSCH may be transmitted simultaneously. The simultaneous transmission of the PUCCH and the second PUSCH may be based on inter-band carrier aggregation.

When the UCI in the PUCCH is multiplexed into a PUSCH, the PUSCH may be determined as one of PUSCHs on the first band.

The simultaneous transmission of the PUCCH on the first band and the second PUSCH on the second band may be allowed based on the parameter, but multiplexing of the PUCCH on the first band and the second PUSCH on the second band may not be allowed.

Based on that the UE is configured with multiplexing between channels with different priorities and that a priority of the PUCCH is different from a priority of the first PUSCH, the UCI in the PUCCH may be transmitted through the first PUSCH other than the second PUSCH.

The UE may receive at least one of scheduling of the first PUSCH and DCI scheduling the second PUSCH over a physical downlink control channel (PDCCH). The DCI may trigger aperiodic channel state information reporting and include a priority index of the corresponding PUSCH.

The UE may resolve an overlap between a PUCCH and a PUSCH with a same priority first, resolve an overlap between PUCCHs with different priorities, and then resolve an overlap between a PUCCH and a PUSCH with different priorities.

In another aspect of the present disclosure, provided herein is a processor-readable recording medium having recorded thereon a program for executing the signal transmission method described above.

In another aspect of the present disclosure, provided herein is a UE configured to perform the signal transmission method described above.

In another aspect of the present disclosure, provided herein is a device for controlling the UE performing the signal transmission method described above In another aspect of the present disclosure, provided herein is a method of receiving a signal by a base station (BS) in a wireless communication system. The method may include: transmitting a parameter related to PUCCH-PUSCH simultaneous transmission to a UE; and receiving a UL signal related to at least one of a PUCCH and one or more PUSCHs overlapping with the PUCCH from the UE. The one or more PUSCHs overlapping with the PUCCH may include at least one of a first PUSCH on a first band to which a cell of the PUCCH belongs and a second PUSCH on a second band having at least one cell. In a state where the UE is enabled to perform the simultaneous transmission of the overlapping PUCCH-PUSCH, the BS may receive the UL signal without de-multiplexing UCI in the PUCCH from the second PUSCH, based on that the first band to which the cell of the PUCCH belongs is different from the second band to which the cell of the second PUSCH belongs.

In a further aspect of the present disclosure, provided herein is a BS configured to perform the signal reception method described above.

Advantageous Effects

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 9 illustrates various examples of overlapping physical uplink control channels/physical uplink shared channels (PUCCHs/PUSCHs).

DETAILED DESCRIPTION

Figure 1:
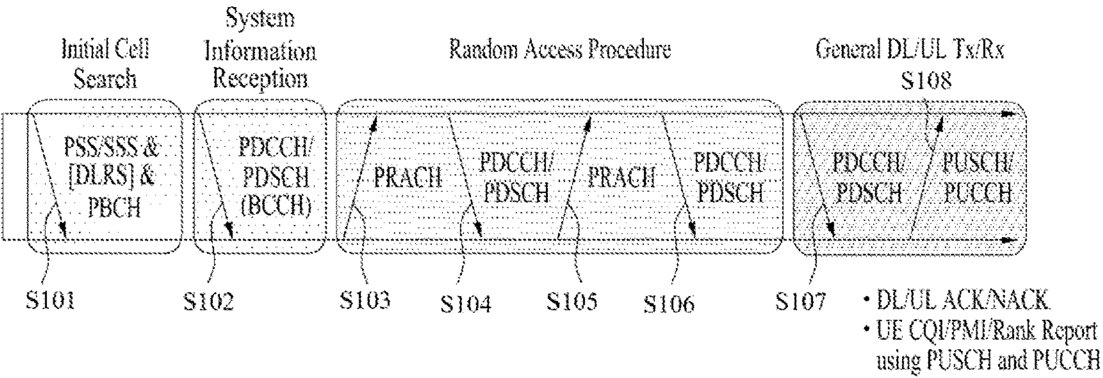
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In the present disclosure, the term "set/setting" may be replaced with "configure/configuration", and both may be used interchangeably. Further, a conditional expression (e.g., "if", "in a case", or "when") may be replaced by "based on that" or "in a state/status". In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, and so on are distinguished from each other and indexed, for convenience of description, which does not mean that each of them necessarily constitutes an independent invention or that each of them should be implemented only individually. Unless explicitly contradicting each other, it may be derived/understood that at least some of the sections, embodiments, examples, options, methods, schemes, and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
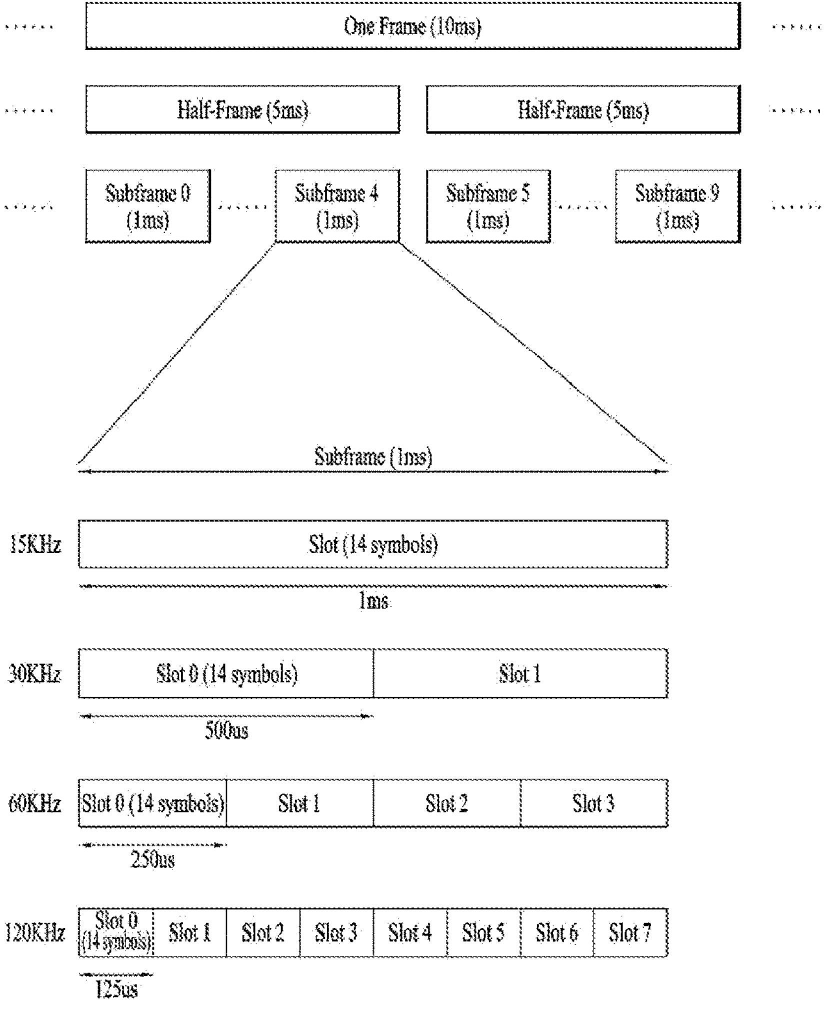
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
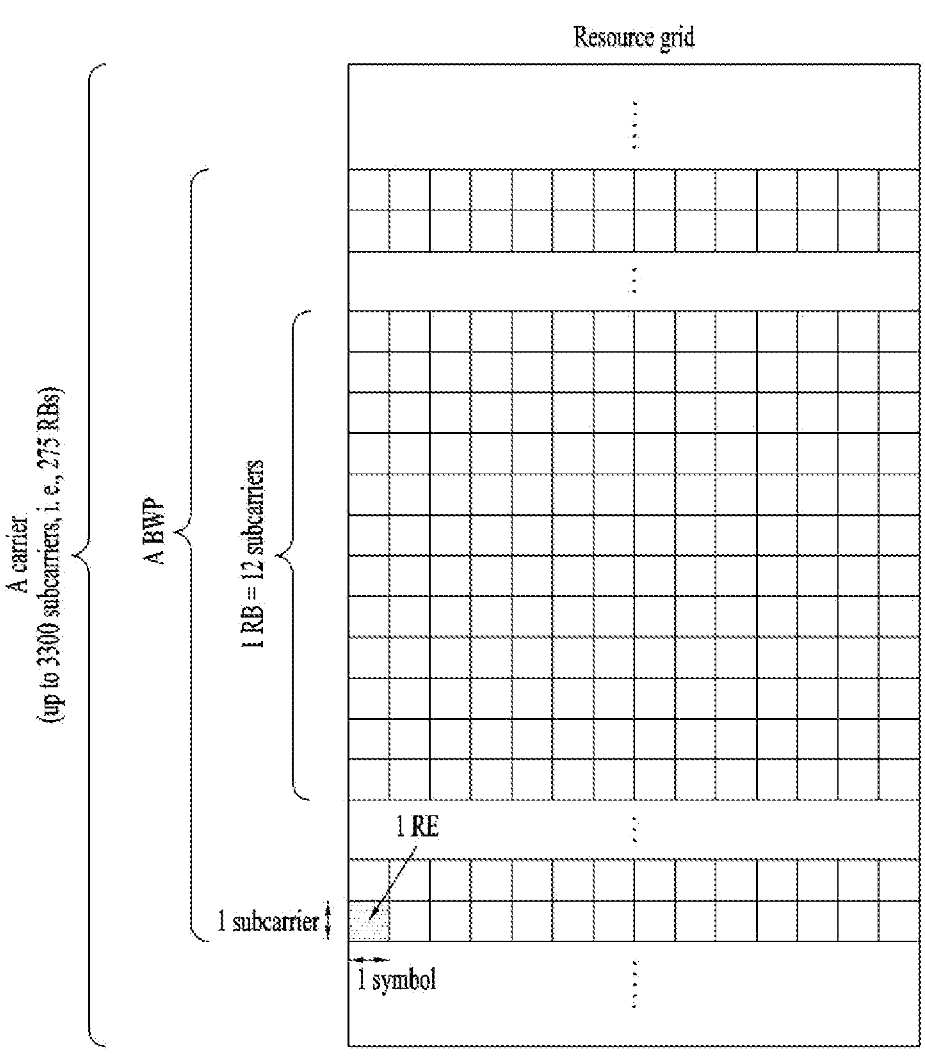
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
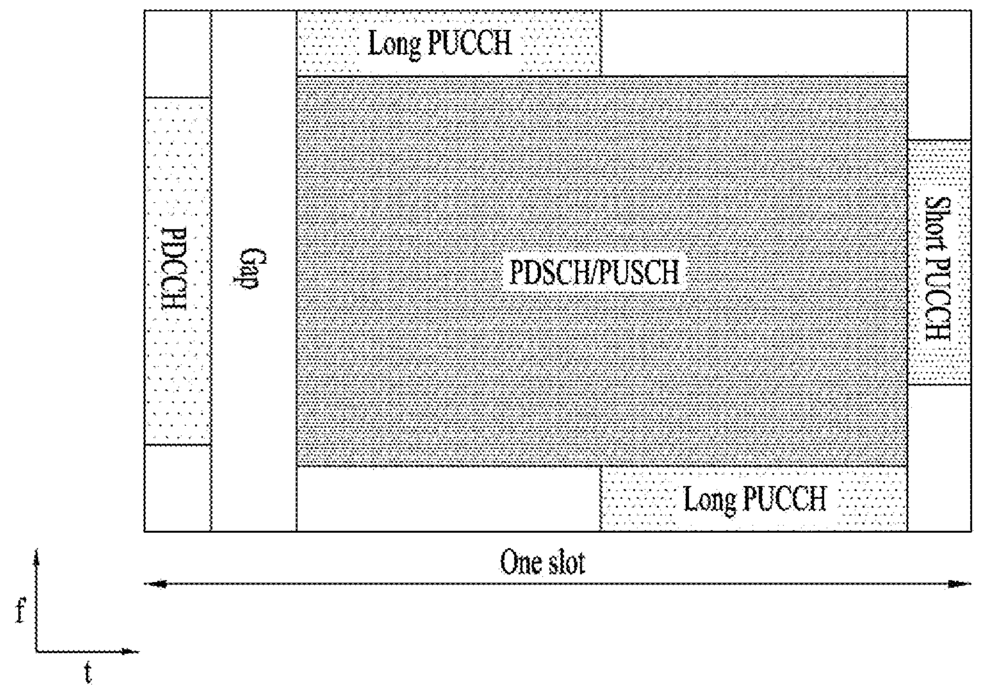
FIG. 4 illustrates exemplary mapping of physical channels in a slot.

FIG. 4 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE.

Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g., a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured through higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.

monitoringSlotPeriodicityAndOffset: A PDCCH monitoring periodicity (in slots) and a PDCCH monitoring offset (in slots).

monitoringSymbolsWithinSlot: PDCCH monitoring symbols in a slot (e.g., the first symbol(s) of a CORESET).

nrofCandidates: The number of PDCCH candidates (one of 0, 1, 2, 3, 4, 5, 6, and 8) for each AL={1, 2, 4, 8, 16}.

An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| UE Specific | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

The PUCCH delivers uplink control information (UCI). The UCI includes the following information.

- SR (Scheduling Request): Information used to request UL-SCH resources.
- HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.
- CSI (Channel State Information): Feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

At least one of one or two or more cells configured to the UE may be configured for PUCCH transmission. At least a primary cell may be set as a cell for the PUCCH transmission. At least one PUCCH cell group may be configured to the UE based on at least one cell where the PUCCH transmission is configured, and each PUCCH cell group includes one or two or more cells. A PUCCH cell group may be simply referred to as a PUCCH group. The PUCCH transmission may be configured not only in the primary cell but also in a secondary cell (Scell). The primary cell belongs to a primary PUCCH group, and the PUCCH-SCell where the PUCCH transmission is configured belongs to a secondary PUCCH group. For cells belonging to the primary PUCCH group, a PUCCH on the primary cell may be used. For cells belonging to the secondary PUCCH group, a PUCCH on the PUCCH-SCell may be used.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 5:
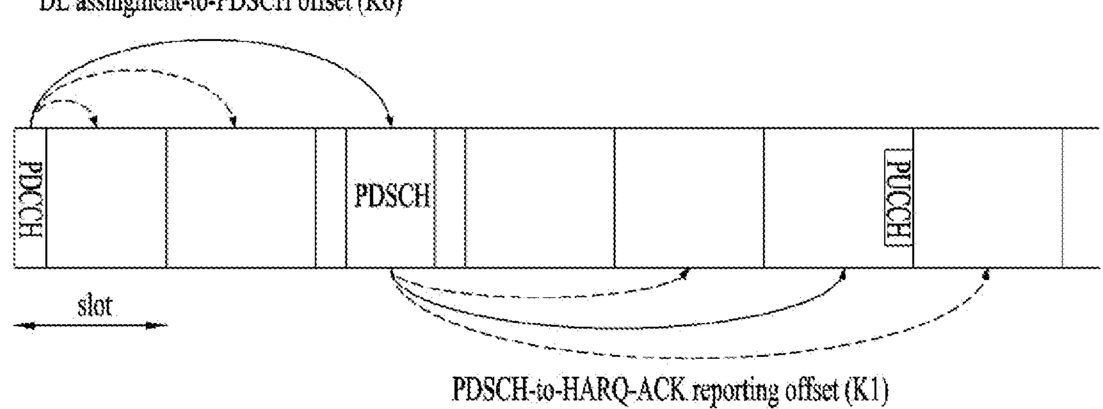
FIG. 5 illustrates an exemplary acknowledgment/negative acknowledgment (ACK/NACK) transmission process.

FIG. 5 illustrates an exemplary ACK/NACK transmission process. Referring to FIG. 5, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

- Frequency domain resource assignment: Indicates an RB set assigned to a PDSCH.
- Time domain resource assignment: Indicates K0 and the starting position (e.g., OFDM symbol index) and length (e.g., the number of OFDM symbols) of the PDSCH in a slot
- PDSCH-to-HARQ_feedback timing indicator: Indicates K1.
- HARQ process number (4 bits): Indicates the HARQ process ID of data (e.g., a PDSCH or TB).

PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bit-wise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 6:
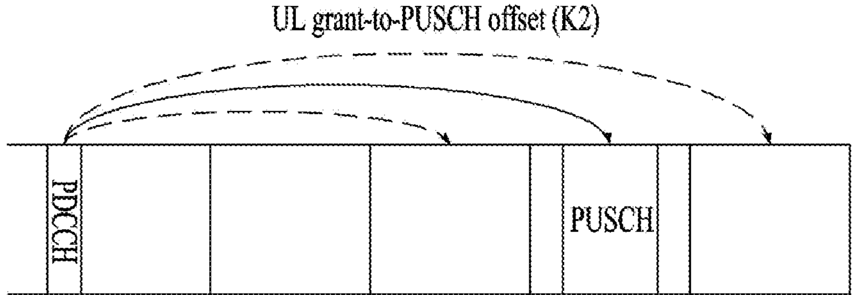
FIG. 6 illustrates an exemplary physical uplink shared channel (PUSCH) transmission process.

FIG. 6 illustrates an exemplary PUSCH transmission procedure. Referring to FIG. 6, the UE may detect a PDCCH in slot #n. The PDCCH includes DL scheduling information (e.g., DCI format 1_0 or 1_1). DCI format 1_0 or 1_1 may include the following information.

Frequency domain resource assignment: Indicates an RB set assigned to the PUSCH.

Time domain resource assignment: Indicates a slot offset K2 and the starting position (e.g., OFDM symbol index) and duration (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Figure 7:
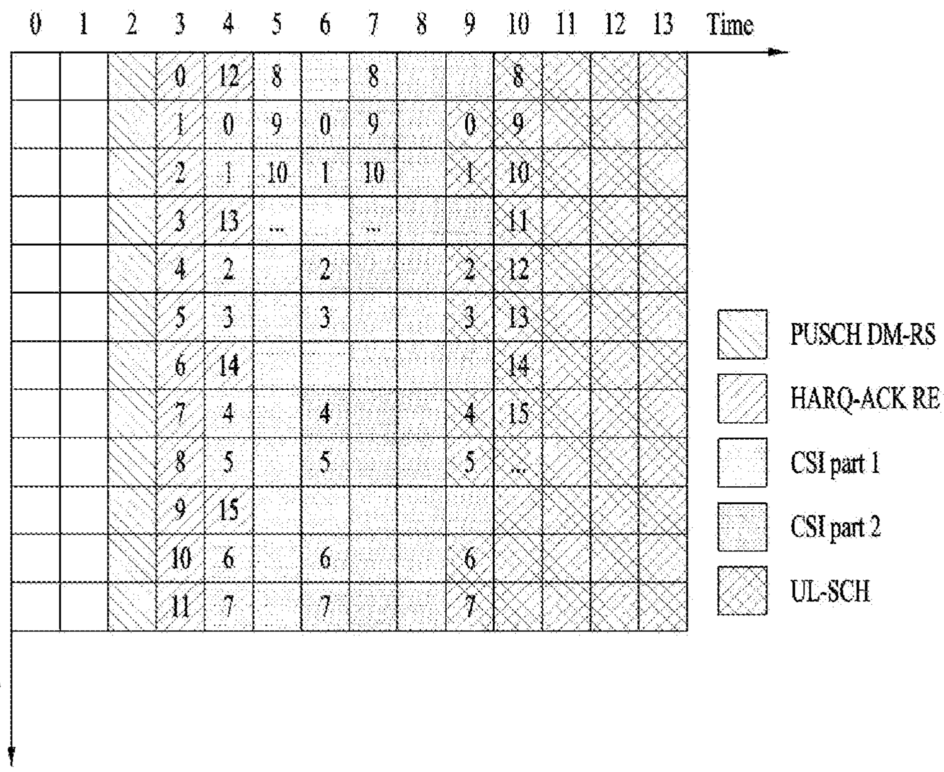
FIG. 7 illustrates an example of multiplexing control information in a PUSCH.

FIG. 7 illustrates exemplary multiplexing of UCI in a PUSCH. When a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 7, an HARQ-ACK and CSI are carried in a PUSCH resource.

NR-Operation Bands

The frequency range (FR) of Rel-16 NR is broadly categorized into FR1 and FR2. Table 6 shows FR1 and FR2 defined in the NR specification TS 38.104.

TABLE 6

| Frequency range designation | Corresponding frequency range |
|---|---|
| FR1 | 410 MHz-7125 MHz |
| FR2 | 24250 MHz-52600 MHz |

In FR1 and FR2, multiple NR operating bands are defined. In Rel-17, there are discussions underway to further expand the FR2 range by defining Rel-16 FR2, which spans from 24250 MHz to 52600 MHz, as FR2-1 and defining the range from 52600 MHz to 71000 MHz as FR2-2.

Table 7 shows the bands belonging to Rel-16 FR1, and Table 8 shows bands belonging to Rel-16 FR2.

TABLE 7

| NR operating band | Uplink (UL) operating band BS receive/ UE transmit $F_{UL,\ low}$-$F_{UL,\ high}$ | Downlink (DL) operating band BS transmit/ UE receive $F_{DL,\ low}$-$F_{DL,\ high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |

TABLE 7-continued

| NR operating band | Uplink (UL) operating band BS receive/ UE transmit $F_{UL,\ low}$-$F_{UL,\ high}$ | Downlink (DL) operating band BS transmit/ UE receive $F_{DL,\ low}$-$F_{DL,\ high}$ | Duplex mode |
|---|---|---|---|
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD |
| n92 | 832 MHz-862 MHz | 1432 MHz-1517 MHz | FDD |
| n93 | 880 MHz-915 MHz | 1427 MHz-1432 MHz | FDD |
| n94 | 880 MHz-915 MHz | 1432 MHz-1517 MHz | FDD |
| n95 | 2010 MHz-2025 MHz | N/A | SUL |
| n96 | 5925 MHz-7125 MHz | 5925 MHz-7125 MHz | TDD |

TABLE 8

| NR operating band | Uplink (UL) and Downlink (DL) operating band BS transmit/receive UE transmit/receive $F_{UL,\ low}$-$F_{UL,\ high}$ $F_{DL,\ low}$-$F_{DL,\ high}$ | Duplex mode |
|---|---|---|
| n257 | 26500 MHz-29500 MHz | TDD |
| n258 | 24250 MHz-27500 MHz | TDD |
| n259 | 39500 MHz-43500 MHz | TDD |
| n260 | 37000 MHz-40000 MHz | TDD |
| n261 | 27500 MHz-28350 MHz | TDD |

For NR wireless communication, the BS/UE needs to support at least one of the bands shown in Table 7/8. The actual operation band may vary depending on the regulations and the implementation of the BS/UE. Additionally, depending on the implementation, one or more carriers/cells may be configured in one band. For carrier aggregation, the UE may be configured with a plurality of cells. In this case, the plurality of cells configured to the UE may belong to the same band or different bands. For example, among the plurality of cells, cells in a first cell group may belong to a first band, and cells in a second cell group may belong to a second band. Carrier aggregation between cells belonging to different bands may be referred to as inter-band carrier aggregation (CA). Carrier aggregation between cells belonging to the same band may be referred to as intra-band CA. When a plurality of UL channels belong to different bands, the UL channels may be located in different cells. The placement of the plurality of UL channels on different cells may be either inter-band CA or intra-band CA depending on situations.

NR-Shared Spectrum/Unlicensed Band (NR-U) Operation

A communication node (e.g., a BS or a UE) operating in an unlicensed band should determine whether other communication node(s) is using a channel, before transmitting a signal.

Definitions of Terms Related to NR-U Operations:

Channel: A carrier or a part of a carrier including consecutive RBs in which a channel access procedure (CAP) is performed in a shared spectrum.

Channel access procedure (CAP): A procedure of evaluating the availability of a channel based on sensing to determine whether the channel is used by other communication node(s), before a signal transmission. A CAP may be referred to as listen-before-talk (LBT).

Channel occupancy: Transmission(s) on channel(s) from a BS/UE after a CAP.

Channel occupancy time (COT): A total time for which the BS/UE and any BS/UE(s) sharing the channel occupancy perform transmission(s) on the channel after the BS/UE corresponding CAPs. When a COT is determined, if a transmission gap is less than or equal to 25 us, the gap duration may also be counted in the COT. The COT may be shared for transmission between the BS and corresponding UE(s).

If a sub-band (SB) in which LBT is performed individually is defined as an LBT-SB, a plurality of LBT-SBs may be included in one wideband cell/BWP. An RB set forming an LBT-SB may be configured through higher-layer signaling (e.g., RRC signaling). Accordingly, one cell/BWP may include one or more LBT-SBs based on (i) the BW of a cell/BWP and (ii) RB set allocation information. A plurality of LBT-SBs may be included in a BWP of a cell (or carrier). An LBT-SB may have, for example, a band of 20 MHz. An LBT-SB may include a plurality of consecutive (P)RBs in the frequency domain and may be referred to as a (P)RB set. While not shown, a guard band (GB) may be included between LBT-SBs. Accordingly, a BWP may be configured in the form of {LBT-SB #0 (RB set #0)+GB #0+LBT-SB #1 (RB set #1+GB #1)+ . . . +LBT-SB #(K−1) (RB set (#K−1))}. For convenience, LBT-SBs/RBs may be configured/defined to be indexed increasingly from a lower frequency band to a higher frequency band.

(1) Type 1 CAP Method

A BS in a type 1 DL CAP and a UE in a type 1 UL CAP may detect whether a channel is idle during sensing slot durations of a defer duration Td, and after a counter N is zero, perform a transmission. The counter N is adjusted by sensing the channel for additional sensing slot duration(s) according to the following procedure:

Step 1) set N=Ninit where Ninit is a random number uniformly distributed between 0 and CWp, and go to step 4.

Step 2) if N>0 and the BS chooses to decrement the counter, set N=N−1.

Step 3) sense the channel for an additional sensing slot duration, and if the additional sensing slot duration is idle, go to step 4; else, go to step 5.

Step 4) if N=0 (Y), stop; else, go to step 2,

Step 5) sense the channel until either a busy sensing slot is detected within an additional defer duration Td or all the sensing slots of the additional defer duration Td are detected to be idle.

Step 6) if the channel is sensed to be idle during all the sensing slot durations of the additional defer duration Td, go to step 4; else, go to step 5.

A type 1 UL CAP may be applied to the following transmissions.

PUSCH/SRS transmission(s) scheduled and/or configured by the BS

PUCCH transmission(s) scheduled and/or configured by the BS

Transmission(s) related to a random access procedure (RAP)

A type 2 CAP is a CAP performed without random backoff. Type 2A, 2B, and 2C are defined for DL, and type 2A, 2B, and 2C are defined for UL. In a type 2A UL CAP, the UE may transmit a signal immediately after a channel is sensed as idle during at least a sensing duration Tshort_dl (=25 us). Tshort_dl includes one sensing slot duration and the immediately following duration Tf (=16 us). In a type 2A UL CAP, Tf includes a sensing slot at the beginning of the duration. In a type 2B UL CAP, the UE may transmit a signal immediately after a channel is sensed as idle for a sensing duration Tf (=16 us). In a type 2B UL CAP, Tf includes a sensing slot within the last 9 us of the duration. In a type 2C UL CAP, the UE does not sense a channel before performing a transmission.

Configured Grant (CG)

A semi-static configured grant (CG) may be configured for the UE by RRC signaling. Up to 12 active CGs may be configured for the UE in a corresponding BWP of a serving cell.

Each CG may be type 1 or type 2. A type 1 CG may be activated/deactivated independently between serving cells. When a plurality of type 2 CGs are configured, each type 2 CG may be individually activated by DCI. One DCI may deactivate one type 2 CG or a plurality of type 2 CGs.

For a CG-based transmission in NR-U (i.e., shared spectrum channel access), configured grant uplink control information (CG-UCI) is transmitted on a corresponding CG PUSCH (i.e., a PUSCH scheduled by a CG). Multiplexing between a PUCCH carrying CG-UCI and a PUCCH carrying an HARQ-ACK in NR-U may be configured/allowed by the BS. When multiplexing between a PUCCH carrying CG-UCI and a PUCCH carrying an HARQ-ACK is not configured, and the PUCCH carrying the HARQ-ACK overlaps with a CG PUSCH within a PUCCH group, the CG PUSCH transmission is dropped.

UL Channels with Different Priority

To support data transmission/services where reliability/latency performance is important such as URLLC, a service/protection priority (e.g., low priority (LP) or high priority (HP)) may be configured for the UE semi-statically (by RRC signaling) or dynamically (by DCI/MAC signaling), for each physical channel/signal (transmission resource) and control information (e.g., UCI).

Specifically, a priority indicator has been introduced to some DCI formats (e.g., DCI format 1_1/1_2 for DL, and DCI format 0_1/0_2 for UL) in NR Rel. 16. When the priority indicator is configured for a corresponding DCI format by higher-layer signaling, the UE blind-decodes the DCI format, assuming that the priority indicator exists. Without explicit signaling indicating that the priority indicator will be used for the DCI format, the UE blind-decodes the DCI format, assuming that the priority indicator is not included in the DCI format. When no priority information is provided for a corresponding DL/UL signal, the UE may assume LP (e.g., priority index=0) for the DL/UL signal. Those skilled in the art will understand that the priority indicator of DCI is one of various means for indicating/configuring a priority, not the only method.

In an example of the above-described prioritization, a lower priority index may be configured/indicated for LP, and a higher priority index may be configured/indicated for HP. Alternatively, a lower bit value (e.g., bit '0') may be configured/indicated for LP, and a higher bit value (e.g., bit '1') may be configured/indicated for HP.

For example, a priority (e.g., LP or HP) may be configured/indicated for each UCI type (e.g., HARQ-ACK, SR, and/or CSI) or for each PUCCH/PUSCH resource configured/indicated for each related UCI transmission. For example, LP/HP may be indicated for an HARQ-ACK for a PDSCH by DL grant DCI that schedules the PDSCH. For example, in case of (aperiodic) CSI, LP/HP may be indicated by DCI (e.g., UL grant DCI scheduling a PUSCH).

In another example, (i) a PUCCH resource set may be configured independently for each priority, and/or (ii) a maximum UCI coding rate for a PUCCH transmission may be configured independently for each priority. In another example, (iii) a beta offset βoffset for encoding UCI on a PUSCH may be configured independently for each priority and/or (iv) an HARQ-ACK codebook type may be configured independently for each priority. At least one of (i) to (iv) or any combination thereof may be used.

In legacy Rel-16 NR, i) it is checked whether a UE processing timeline related to PUCCH/PUSCH transmission is satisfied for each priority (for example, a minimum processing time N1 between the reception time of a PDSCH (e.g., PDSCH ending symbol) and the transmission time of a HARQ-ACK therefor (e.g., HARQ-ACK starting symbol) and/or a minimum processing time N2 between the reception time of a PDCCH (e.g., PDCCH ending symbol) and the transmission time of a PUSCH/PUCCH related thereto (e.g., PUSCH/PUCCH starting symbol)); and ii) a UCI/UL multiplexing process (where multiple PUCCHs/PUSCHs overlapping in time are merged (multiplexed) into one UL channel) is performed (that is, the UE processing timeline check and UCI/UL multiplexing processes are performed for the same priority). If the outcomes for LP and HP PUCCHs/PUSCHs, which are the multiplexing results, overlap in time, transmission of the LP PUCCH/PUSCH is dropped, and only transmission of the HP PUCCH/PUSCH is performed (See Section 9.2.5 of 3GPP TS 38.213 V16.2.0).

In Rel-17 NR, when multiplexing between LP and HP UL channels for transmission is enabled (for example, when the following operations are enabled: multiplexing UCI in PUCCHs with different priorities on a single PUCCH; and/or multiplexing UCI in a PUCCH and PUSCH (or in PUCCHs) with different priorities on the PUSCH), the UE processing timeline check and UCI/UL multiplexing processes may be performed between DL channels (e.g., PDSCH/PDCCH) and UL channels (e.g., PUCCH/PUSCH) with different priorities as well as the same priority (i.e. for inter-priority channels). Then, the outcomes for LP and HP PUCCHs/PUSCHs, which are the multiplexing results, may be transmitted.

In legacy Rel-10 LTE-A, an operation in which the UE simultaneously transmits a PUCCH and PUSCH at the same point in time (e.g., subframe) is introduced. In addition, whether simultaneous PUCCH+PUSCH transmission is allowed is defined as the capability of the UE. Accordingly, the eNB may enable or disable the simultaneous PUCCH+PUSCH transmission for a UE with the corresponding capability (if the UE reports the capability to the eNB). The UE may be configured to perform UL transmission according to the corresponding configuration (for example, if the configuration is "ON," the UE may perform simultaneous PUCCH+PUSCH transmission, whereas if the configuration is "OFF," the UE may perform the traditional PUCCH-only or PUSCH-only operation (defined in Rel-8 LTE or Rel-15 NR)). Table 9 below shows UCI and UL channel transmission operations performed by the UE based on the ON/OFF configuration of simultaneous PUCCH+PUSCH transmission defined in Rel-S) LTE-A.

TABLE 9

| |
|---|
| 1) When simultaneous PUCCH + PUSCH transmission is set to OFF |
| A. If a HARQ-ACK PUCCH and PUSCH overlap at the same time, the UE piggybacks the HARQ-ACK on the PUSCH for transmission (i.e., HARQ-ACK on PUSCH). |
| B. If a periodic CSI PUCCH and PUSCH overlap at the same time, the UE piggybacks the periodic CSI (P-CSI) on the PUSCH for transmission (i.e., P-CSI on PUSCH). |
| C. If a HARQ-ACK, P-CSI, and PUSCH overlap at the same time, the UE piggybacks both the HARQ-ACK and P-CSI on the PUSCH for transmission (i.e., {HARQ-ACK + P-CSI} on PUSCH). |
| 2) When simultaneous PUCCH + PUSCH transmission is set to ON |
| A. If a HARQ-ACK PUCCH and PUSCH overlap at the same time, the UE simultaneously transmits the HARQ-ACK on the PUCCH and a pure PUSCH (i.e., HARQ-ACK PUCCH + pure PUSCH). |
| B. If a P-CSI PUCCH and PUSCH overlap at the same time, the UE simultaneously transmits the P-CSI on the PUCCH and a pure PUSCH (i.e., P-CSI PUCCH + pure PUSCH). |
| C. If a HARQ-ACK, P-CSI, and PUSCH overlap at the same time, the UE simultaneously transmits the HARQ-ACK on the PUCCH and a PUSCH where the CSI is piggybacked (i.e., HARQ-ACK on PUCCH + P-CSI on PUSCH). |

In Rel-17 NR, when the simultaneous PUCCH+PUSCH transmission is enabled, UL multiplexing transmission between LP and HP channels may also be enabled simultaneously (for example, between a PUCCH and PUSCH on different frequency bands (or different serving cells) with different priorities). In this case, it may be necessary to define UE operations to be performed/applied according to a combination of UL channels (e.g., PUCCH and/or PUSCH) overlapping in time (between different priorities).

In the URLLC scenarios, different priorities (e.g., LP and HP) may be configured/instructed for transmission of each UCI type (e.g., HARQ-ACK (A/N), SR, CSI, etc.) and/or each UL channel (e.g., PUCCH, PUSCH, etc.). In these situations, it may be necessary to define specific UE/BS operations for simultaneous PUCCH+PUSCH transmission (for example, which type of UCI and/or which priority of UCI will be transmitted on which UL channel).

Accordingly, the present disclosure proposes a method of simultaneously transmitting a PUCCH and PUSCH in scenarios where different priorities are configured/indicated for UCI types and/or UL channels (for example, for a PUCCH and PUSCH configured/indicated at the same time (e.g., in the same slot, same sub-slot, or same symbol)). The proposals described later may be equally applied when the same priority is configured/indicated for each UCI type and/or UL channel (or where there is no separate priority configuration/indication).

For convenience of description, a specific priority is defined as XP, and a priority different from XP is defined as YP. For example, if XP=LP, it may mean that YP=HP. As another example, if XP=HP, it may mean that YP=LP. When two or more priorities are configured/defined, if XP=first priority, it may mean that YP=all or some of the remaining priorities except for the first priority, and vice versa.

In the following, when a first signal and a second signal are configured/indicated at the same time, it may mean that resources for the first signal and resources for the second signal fully overlap in the time domain. However, the present disclosure is not limited thereto. For example, when the resources for the first signal and the resources for the second signal overlap at least partially in the time domain, it may be understood that the first signal and the second signal are configured/indicated/scheduled at the same time. Additionally, transmitting, by the UE, a specific channel/signal may be interpreted as receiving, by the BS, the specific channel/signal.

In the present disclosure, when a plurality of UL channels overlap in time, it may mean that resources of the UL channels overlap in the same OFDM symbol or that the resources of the UL channels are included in the same slot (or sub-slot) duration. In the present disclosure, multiplexing between two UL channels may mean not only an operation of multiplexing and transmitting control information/data carried on the two UL channels on a single UL channel but also a prioritization operation of dropping transmission of a specific UL channel among the two UL channels and transmitting only the remaining UL channel.

[Proposal 1]

First, when a plurality of PUCCHs/PUSCHs with the same/different priorities overlap in time, a method of performing UCI/UL (channel) multiplexing according to the following processes/steps may be considered.

1) Alt 1

Step 1: The UE may perform multiplexing on all PUCCHs that have the same or different priorities and overlap in time.

Step 2: Based on the multiplexing results in step 1, the UE may perform multiplexing on all PUCCHs and PUSCHs that have the same or different priorities and overlap in time.

2 Alt 2

Step 1: In step 1, the UE may resolve the overlap between PUCCHs/PUSCHs with the same priority (e.g., B05 in FIG. 10). For example, the UE may first perform multiplexing on PUCCHs that have the same priority for each priority and overlap in time (sub-step 1-1). Based on the multiplexing results in sub-step 1-1, the UE may perform multiplexing again on PUCCHs and PUSCHs that have the same priority for each priority and overlap in time (sub-step 1-2).

Step 2: Based on the multiplexing results in step 1, the UE may first perform multiplexing on PUCCHs with different priorities and overlapping in time (sub-step 2-1) (B10 in FIG. 10). Based on the multiplexing results in sub-step 2-1, the UE can perform multiplexing again on PUCCHs and PUSCHs that have different priorities and overlap in time (sub-step 2-2) (B15 in FIG. 10).

Based on the above explanation, (at least one of) the following three operating parameters may (individually) be set as either enabled or disabled (e.g., at least one is configured through higher layer signaling).

1) Inter-P_PUCCH_mux: For PUCCHs with different priorities, Inter-P_PUCCH_mux is a parameter to configure whether UCI in the PUCCHs is capable of being multiplexed on a single PUCCH.

2) Inter-P_PUSCH_mux: For a PUCCH and PUSCH with different priorities, Inter-P_PUSCH_mux is a parameter to configure whether UCI in the corresponding PUCCH is capable of being multiplexed on the corresponding PUSCH.

3) PUCCH+PUSCH_TX: For a PUCCH and PUSCH on different bands (or cells) with different priorities, PUCCH+PUSCH_TX is a parameter to configure whether simultaneous transmission of the corresponding PUCCH and PUSCH is possible. For example, when the UE receives the parameter PUCCH+PUSCH_TX configured as follows: PUCCH+PUSCH_TX Enable, the UE may simultaneously transmit a PUCCH on a first cell and a PUSCH on a second cell, based on that the first cell and the second cell (belonging to the same PUCCH group) are located on different bands and that the PUCCH on the first cell and the PUSCH on the second cell have different priority indices. The parameter PUCCH+PUSCH_TX is for simultaneous transmission of a PUCCH and PUSCH with different priorities, PUCCH+PUSCH_TX Enable may not allow simultaneous transmission of a PUCCH and PUSCH with the same priority.

Based on the application of Alt 2, the following operations may be considered depending on the multiplexing results (outcomes) in step 1 and the Enable/Disable configurations for the above three parameters 1) Case 1

A. Outcome of Step 1 for LP i. After one or more LP PUCCHs overlapping in time are multiplexed on a specific LP PUCCH (e.g., LP-mux PUCCH) through sub-step 1-1, the LP-mux PUCCH may then overlap in time with a specific LP PUSCH. As a result, the final LP outcome of step 1 may be a LP PUSCH multiplexed with LP UCI (e.g., LP UCI-PUSCH).

B. Outcome of Step 1 for HP i. After one or more HP PUCCHs overlapping in time are multiplexed on a specific HP PUCCH (e.g., HP-mux PUCCH) through sub-step 1-1, the HP-mux PUCCH may then overlap in time with a specific HP PUSCH. As a result, the final HP outcome of step 1 may be a HP PUSCH multiplexed with HP UCI (e.g., HP UCI-PUSCH).

C. In this case, if the LP outcome overlaps in time with the HP outcome (on the same cell) or another HP PUSCH (not multiplexed with UCI) (e.g., HP pure-PUSCH), the following operation may be considered.

i. When Inter-P_PUSCH_Mux is Set to Enable

1. Opt 1: Transmission of the entire LP UCI-PUSCH, which is the LP outcome, may be dropped.

2. Opt 2: The LP UCI included in the LP outcome may be multiplexed on the HP outcome or HP pure-PUSCH (overlapping in time), and transmission of the LP PUSCH may be dropped.

ii. When Inter-P_PUSCH_Mux is Set to Disable

1. Opt 1: Transmission of the entire LP UCI-PUSCH, which is the LP outcome, may be dropped.

D. If the HP outcome overlaps with the LP pure-PUSCH (on the same cell), transmission of the corresponding LP pure-PUSCH may be dropped.

E. In Case 1, the operations may not vary depending on the Enable/Disable configurations for Inter-P_PUCCH_mux and PUCCH+PUSCH_TX.

2) Case 2

A. Outcome of Step 1 for LP

As in Case 1 above, a LP UCI-PUSCH may be the final LP outcome of step 1.

B. Outcome of Step 1 for HP i. After one or more HP PUCCHs overlapping in time are multiplexed on a specific HP PUCCH (e.g., HP-mux PUCCH) through sub-step 1-1, the HP-mux PUCCH may not overlap in time with a HP PUSCH. As a result, the corresponding HP-mux PUCCH may be the final HP outcome of step 1.

C. In this case, if the HP outcome overlaps in time with a LP outcome or another LP pure-PUSCH (on any cell), the following operations may be considered.

i. When Inter-P_PUSCH_mux and PUCCH+PUSCH_TX are configured as follows: Inter-P_PUSCH_mux Enable and PUCCH+PUSCH_TX=Disable, HP UCI included in the HP-mux PUCCH may be multiplexed on the LP outcome or LP pure-PUSCH (overlapping in time) and then transmitted.

ii. When Inter-P_PUSCH_mux and PUCCH+PUSCH_TX are configured as follows: Inter-P_PUSCH_mux=Disable and PUCCH+PUSCH_TX=Disable:

1. Opt A: Only the HP-mux PUCCH may be transmitted, and transmission of the entire LP outcome or LP pure-PUSCH overlapping in time with the HP-mux PUCCH may be dropped (this operation may be applicable both when Inter-P_PUCCH_mux is set to Enable or Disable).

2. Opt B: When the LP pure-PUSCH overlaps in time, transmission of the corresponding LP pure-PUSCH may be dropped. When the LP outcome overlaps in time, LP UCI included in the LP outcome and the HP-mux PUCCH may be multiplexed on a single PUCCH, and the LP PUSCH transmission may be dropped (This operation may be applicable only if Inter-P_PUCCH_mux is set to Enable).

iii. When Inter-P_PUSCH_mux and PUCCH+PUSCH_TX are configured as follows: Inter-P_PUSCH_mux=Disable and PUCCH+PUSCH_TX=Enable, if the LP PUSCH overlapping in time is on the same band (or cell) (as the HP-mux PUCCH), the operations in Opt A/B may be applied. If the LP PUSCH is on a different band (or cell), simultaneous transmission of the HP-mux PUCCH and LP PUSCH may be performed.

iv. When Inter-P_PUSCH_mux and PUCCH+PUSCH_TX are configured as follows: Inter-P_PUSCH_mux=Enable and PUCCH+PUSCH_TX=Enable, if the LP PUSCH overlapping in time is on the same band (or cell) (as the HP-mux PUCCH), the HP UCI included in the HP-mux PUCCH may be multiplexed on the corresponding LP PUSCH. If the LP PUSCH is on a different band (or cell), simultaneous transmission of the HP-mux PUCCH and LP PUSCH may be performed.

D. If the LP outcome overlaps with a HP pure-PUSCH (on the same cell), operations in Opt 1/2 in Case 1 above may be applied.

E. In Case 2, the operations in Opt A/B may vary depending on the Enable/Disable configuration for Inter-P_PUCCH_mux.

3) Case 3

A. Outcome of Step 1 for LP i. After one or more LP PUCCHs overlapping in time are multiplexed on a specific LP PUCCH (e.g., LP-mux PUCCH) through sub-step 1-1, the LP-mux PUCCH may not overlap in time with a LP PUSCH. As a result, the corresponding LP-mux PUCCH may be the final LP outcome of step 1.

B. Outcome of Step 1 for HP i. As in Case 1 above, a HP UCI-PUSCH may be the final HP outcome of step 1.

C. In this case, if the LP outcome overlaps in time with a HP outcome or another HP pure-PUSCH (on any cell), the following operations may be considered.

i. When Inter-P_PUSCH_mux and PUCCH+PUSCH_TX are configured as follows: Inter-P_PUSCH_mux Enable and PUCCH+PUSCH_TX=Disable, LP UCI included in the LP-mux PUCCH may be multiplexed on the HP outcome or HP pure-PUSCH (overlapping in time) and then transmitted.

ii. When Inter-P_PUSCH_mux and PUCCH+PUSCH_TX are configured as follows: Inter-P_PUSCH_mux=Disable and PUCCH+PUSCH_TX=Disable, only the HP outcome or HP pure-PUSCH overlapping in time may be transmitted, and transmission of the LP-mux PUCCH transmission may be dropped.

iii. When Inter-P_PUSCH_mux and PUCCH+PUSCH_TX are configured as follows: Inter-P_PUSCH_mux=Disable and PUCCH+PUSCH_TX=Enable, if the HP PUSCH overlapping in time is on the same band (or cell) (as the LP-mux PUCCH), transmission of the LP-mux PUCCH may be dropped. If the HP PUSCH is on a different band (or cell), simultaneous transmission of the LP-mux PUCCH and HP PUSCH may be performed.

iv. When Inter-P_PUSCH_mux and PUCCH+PUSCH_TX are configured as follows: Inter-P_PUSCH_mux=Enable and PUCCH+PUSCH_TX=Enable, if the HP PUSCH overlapping in time is on the same band (or cell) (as the LP-mux PUCCH), the LP UCI included in the LP-mux PUCCH may be multiplexed on the corresponding HP PUSCH. If the HP PUSCH is on a different band (or cell), simultaneous transmission of the LP-mux PUCCH and HP PUSCH may be performed.

D. If the HP outcome overlaps with a LP pure-PUSCH (on the same cell), transmission of the corresponding LP pure-PUSCH may be dropped.

E. In Case 3, no operations may vary depending on the Enable/Disable configuration for Inter-P_PUCCH_mux.

4) Case 4

A. Outcome of Step 1 for LP

As in Case 3 above, a LP-mux PUCCH may be the final LP outcome of step 1.

B. Outcome of Step 1 for HP

As in Case 2 above, a HP-mux PUCCH may be the final HP outcome of step 1.

C. Case 4-1 i. When the LP outcome overlaps in time with the HP outcome, LP UCI included in the LP outcome and HP UCI included in the HP outcome may be multiplexed on a single PUCCH (e.g., HP+LP-mux PUCCH). The corresponding HP+LP-mux PUCCH may be the outcome of sub-step 2-1 in step 2 above.

ii. In this case, if the HP+LP-mux PUCCH overlaps in time with a HP pure-PUSCH or LP pure-PUSCH (on any cell), the following operations may be considered.

i. When Inter-P_PUSCH_mux and PUCCH+PUSCH_TX are configured as follows: Inter-P_PUSCH_mux=Enable and PUCCH+PUSCH_TX=disable, HP UCI and LP UCI included in the HP+LP-mux PUCCH may be multiplexed on the HP pure-PUSCH or LP pure-PUSCH (overlapping in time) and then transmitted.

ii. When Inter-P_PUSCH_mux and PUCCH+PUSCH_TX are configured as follows: Inter-P_PUSCH_mux=Disable and PUCCH+PUSCH_TX=Disable:

a) Opt A: Only the HP+LP-mux PUCCH may be transmitted, and transmission of the HP pure-PUSCH or LP pure-PUSCH overlapping in time with the HP+LP-mux PUCCH may be dropped.

b) Opt B: When the LP pure-PUSCH overlaps in time, transmission of the corresponding LP pure-PUSCH may be dropped. When HP pure-PUSCH overlaps in time, the HP UCI included in the HP+LP-mux PUCCH may be multiplexed on the HP pure-PUSCH, and transmission of the LP UCI may be dropped.

3. When Inter-P_PUSCH_mux and PUCCH+PUSCH_TX are configured as follows: Inter-P_PUSCH_mux=Disable and PUCCH+PUSCH_TX=Enable, if the HP PUSCH or LP PUSCH overlapping in time is on the same band (or cell) (as the HP+LP-mux PUCCH), the operations in Opt A/B may be applied. If the HP PUSCH or LP PUSCH is on a different band (or cell), simultaneous transmission of the HP+LP-mux PUCCH and PUSCH may be performed.

4. When Inter-P_PUSCH_mux and PUCCH+PUSCH_TX are configured as follows: Inter-P_PUSCH_mux=Enable and PUCCH+PUSCH_TX=Enable, if the HP PUSCH or LP PUSCH overlapping in time is on the same band (or cell) (as the HP+LP-mux PUCCH), the HP UCI and LP UCI included in the HP+LP-mux PUCCH may be multiplexed on the corresponding PUSCH. If the HP PUSCH or LP PUSCH is on a different band (or cell), simultaneous transmission of the HP-mux PUCCH and PUSCH may be performed.

iii. In Case 4-1, when Inter-P_PUCCH_mux is configured as follows: Inter-P_PUCCH_mux=Disable, transmission of the LP-mux PUCCH in sub-step 2-1 of step 2 may be dropped, and the HP-mux PUCCH may be the outcome (in this case, the operations described in Case 2 above may be applied).

D. Case 4-2 i. When the LP outcome does not overlap in time with the HP outcome, both the HP-mux PUCCH and LP-mux PUCCH may be the outcome of sub-step 2-1 in step 2.

ii. In this case, if an XP-mux PUCCH overlaps in time with an YP pure-PUSCH (on any cell), the following operations may be considered.

1. When Inter-P_PUSCH_mux and PUCCH+PUSCH_TX are configured as follows: Inter-P_PUSCH_mux Enable and PUCCH+PUSCH_TX=Disable, XP UCI included in the XP-mux PUCCH may be multiplexed on the YP PUSCH (overlapping in time) and then transmitted.

2. When Inter-P_PUSCH_mux and PUCCH+PUSCH_TX are configured as follows: Inter-P_PUSCH_mux=Disable and PUCCH+PUSCH_TX=Disable, only the HP-mux PUCCH (or HP PUSCH) may be transmitted, and transmission of the LP PUSCH (or LP-mux PUCCH) overlapping in time therewith may be dropped.

3. When Inter-P_PUSCH_mux and PUCCH+PUSCH_TX are configured as follows: Inter-P_PUSCH_mux=Disable and PUCCH+PUSCH_TX=Enable, if the LP PUSCH (or LP-mux PUCCH) overlapping in time is on the same band (or cell) (as the HP-mux PUCCH (or HP PUSCH), transmission of the LP PUSCH (or LP-mux PUCCH) may be dropped. If the LP PUSCH (or LP-mux PUCCH) is on a different band (or cell), simultaneous transmission of the HP-mux PUCCH (or HP PUSCH) and LP PUSCH (or LP-mux PUCCH) may be performed.

4. When Inter-P_PUSCH_mux and PUCCH+PUSCH_TX are configured as follows: Inter-P_PUSCH_mux=Enable and PUCCH+PUSCH_TX=Enable, if the YP PUSCH overlapping in time is on the same band (or cell) (as the XP-mux PUCCH), the XP UCI included in the XP-mux PUCCH may be multiplexed on the corresponding YP PUSCH. If the YP PUSCH is on a different band (or cell), simultaneous transmission of the XP-mux PUCCH and YP PUSCH may be performed.

iii. In Case 4-2, no operations may vary depending on the Enable/Disable configuration for Inter-P_PUCCH_mux.

For a combination where Inter-P_PUCCH_mux=Enable and Inter-P_PUSCH_mux=Disable are configured, Alt 1 may be applied as an exception (while Alt 2 may be applied for the remaining combinations). In the above combination, if step 1 of Alt 2, which is multiplexing for the same priority, is applied and then LP UCI is multiplexed on a LP PUSCH, it is more likely to be dropped due to an overlap in time with a HP PUCCH or HP PUSCH in step 2. However, when Alt 1 is applied, even if a LP PUCCH overlaps with a HP PUCCH in step 1, the LP PUCCH is more likely to be multiplexed without being dropped. Alternatively, when Inter-P_PUCCH is configured as follows: Inter-P_PUCCH_mux=Enable, it may be stipulated/enforced that Inter-P_PUSCH_mux is always configured as follow: Inter-P_PUSCH_mux=Enable.

[Proposal 2]

Additionally, when PUCCH+PUSCH_TX is configured as follows: PUCCH+PUSCH_TX=Enable (e.g., when the UE is configured with parameters for simultaneous transmission of an XP PUCCH and YP PUSCH on different bands), the following UCI/UL (channel) multiplexing transmission operation methods may be considered for PUSCH transmission. For example, PUSCH transmission may be a scheduled PUSCH (e.g., PUSCH transmission scheduled by UL grant DCI), but the present disclosure is not limited thereto. That is, the PUSCH transmission may be a PUSCH transmitted based on a configured grant (CG). As a specific example of the scheduled PUSCH, it may be considered that transmission of an aperiodic CSI report (e.g., aperiodic channel state information (A-CSI)) on a specific PUSCH is triggered. As described above, the UL grant DCI that triggers A-CSI on the PUSCH may include a field indicating the priority index of the corresponding PUSCH. Alternatively, if no separate priority index is indicated by DCI, the priority of the corresponding PUSCH may be considered as LP.

1) Alt A

The UE may be configured to multiplex (piggyback) UCI in a PUCCH only on a PUSCH (which overlaps with the PUCCH) on the same band (or cell) as the PUCCH. As one of the conditions that should be satisfied to multiplex (piggyback) UCI in an XP PUCCH on a YP PUSCH, the XP PUCCH and YP PUSCH may be required to be located on the same band. For example, the UE may not be allowed to piggyback UCI in a first PUCCH on a first band on a second PUSCH (overlapping in time with the first PUCCH) on a second band (or cell), which is different from the first band, where the second PUSCH may be, for example, an A-CSI triggered PUSCH or another PUSCH. In this case, if a first PUSCH overlapping in time with the first PUCCH is scheduled on the first band, the UE may piggyback the UCI in the first PUCCH on the first PUSCH on the same first band (or cell). If there is no first PUSCH on the first band that overlaps in time with the first PUCCH, the UE may simultaneously transmit the first PUCCH on the first band and the second PUSCH on the second band. In this case, it is assumed that the priority index of the first PUCCH is different from the priority index of the second PUSCH. On the other hand, cells belonging to the same PUCCH (cell) group may be sub-grouped into one or two or more sub-groups, which will be described later. The cells belonging to the same sub-group may be on the same band, and cells belonging to different sub-groups may be on different bands. For example, when a first cell and second cell configured for CA belong to the same PUCCH cell group, if the first cell and second cell are on different bands (for example, inter-band CA in Table 7/8), the first cell and second cell may belong to different sub-groups. According to the proposal, inter-band CA is required for simultaneous PUCCH/PUSCH transmission, which offers advantages in terms of reducing the complexity of radio frequency (RF) modules of the UE and the low peak-to-average-power ratio (PAPR). For example, the UE uses a relatively compact and cost-effective RF modules compared to the BS, which results in constraints on the frequency range be covered by one RF module of the UE. For example, different RF modules may be required for bands that are widely separated in the frequency domain. Simultaneous transmission based on different RF modules may not cause PAPR issues due to OFDM modulation, but PUCCH/PUSCH transmission based on the same RF module may cause a relatively high PAPR. Therefore, when a PUCCH and PUSCH are on the same band, the PUCCH may be piggybacked on the PUSCH, thereby reducing the UE complexity and PAPR.

Figure 8:
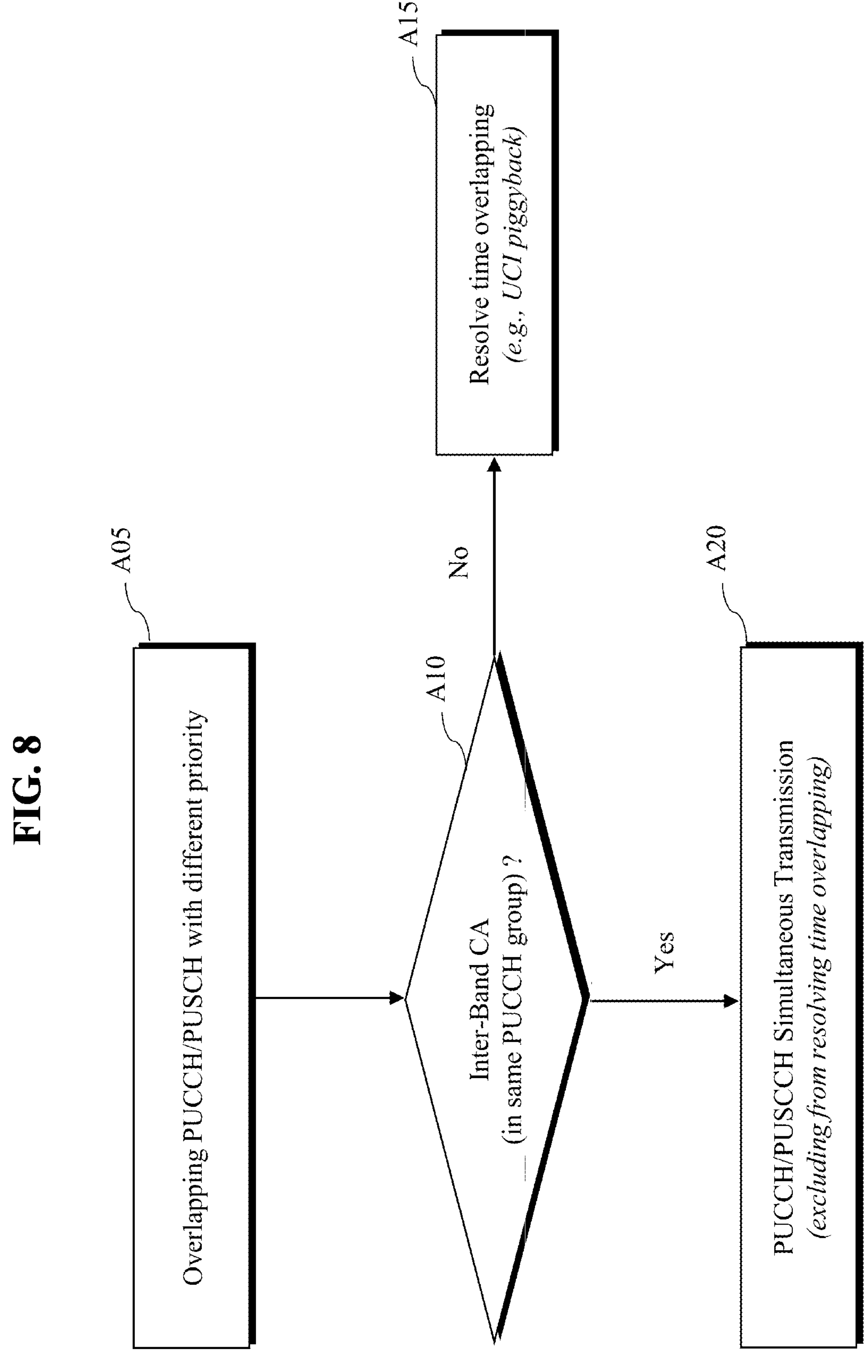
FIG. 8 illustrates an uplink (UL) signal transmission method according to an embodiment of the present disclosure.

FIG. 8 illustrates a UL signal transmission method according to an embodiment of the present disclosure (e.g., method related to 1) Alt A of Proposal 2). In FIG. 8, it is assumed that the parameter PUCCH+PUSCH_TX=Enable is configured to the UE to configure that simultaneous transmission of a PUCCH and PUSCH on different bands (and different cells) with different priorities is allowed. Referring to FIG. 8, the PUCCH and PUSCH with different priorities may overlap with each other (A05). The UE may check whether the overlapping PUCCH and PUSCH are for inter-band CA (in the same PUCCH group) (A10) and perform UL transmission. If a cell for the overlapping PUCCH and a cell for the overlapping PUSCH are on different bands (while the cells belong to the same PUCCH group) (i.e., Yes in A10: inter-band CA), the UE transmits the PUCCH and PUSCH simultaneously (A20). Otherwise (No in A10), the UE needs to perform an operation to resolve the overlap between the PUCCH and PUSCH (A15). As an example of the operation to resolve the overlap between the PUCCH and PUSCH, UCI in the PUCCH may be piggybacked on the PUSCH. In this case, the PUSCH carrying the UCI may be transmitted without transmitting the PUCCH. On the other hand, if it is determined to transmit the PUCCH and PUSCH simultaneously, the corresponding PUCCH and PUSCH may be excluded from the overlap resolution operation performed by the UE.

FIG. 9 illustrates various examples of overlapping PUCCHs/PUSCHs (e.g., various application examples of FIG. 8). In FIG. 9, it is assumed that the parameter PUCCH+PUSCH_TX=Enable is configured to the UE to configure that simultaneous transmission of a PUCCH and PUSCH on different bands (and different cells) with different priorities is allowed. It is also assumed that Cell A, Cell B, and Cell C belong to Band 1, and Cell D belongs to Band 2.

Referring to FIG. 9(*a*), an XP PUCCH 802*a*, an YP PUSCH 801*a*, and an YP PUSCH 803*a* overlap in the time domain. Based on that multiplexing between channels of different priorities is configured, the UE multiplexes (e.g., piggybacks) UCI in the XP PUCCH 802*a* onto the YP PUSCH 801*a*, which overlaps with the XP PUCCH 802*a*, on the same band, Band 1. The YP PUSCH 803*a* in Band 2 is transmitted without UCI multiplexing.

Referring to FIG. 9(*b*), an XP PUCCH 802*b*, an YP PUSCH 801*b*, an YP PUSCH 803*b*, and an YP PUSCH 804 overlap in the time domain. Based on that multiplexing between channels of different priorities is configured, the UE determines that one of the YP PUSCH 801*b* and YP PUSCH 804*b* in Band 1 is an YP PUSCH to be multiplex with UCI in the XP PUCCH 802*a*. The YP PUSCH 803*b* in Band 2 is transmitted without UCI multiplexing.

Figure 10:
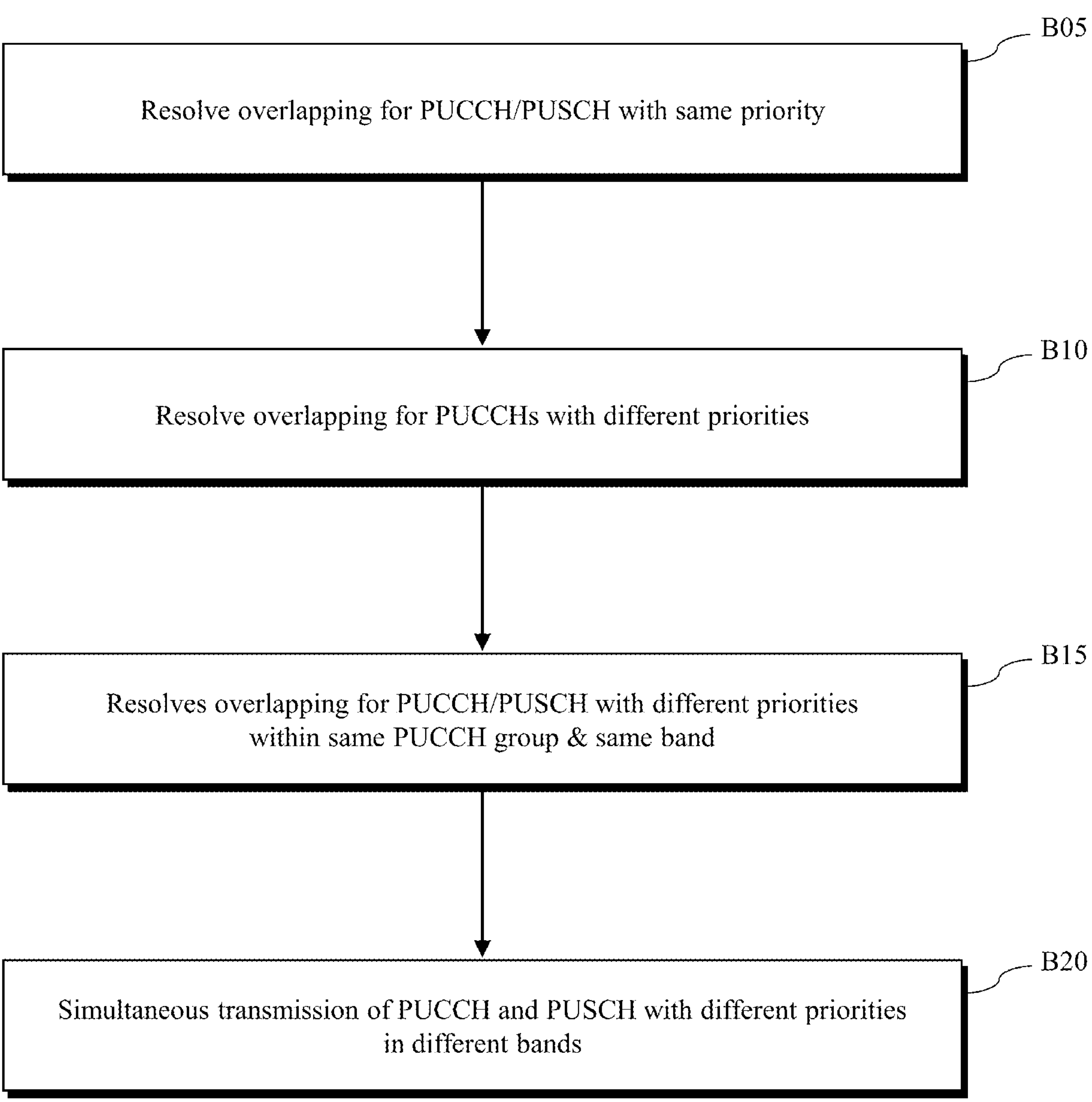
FIG. 10 is a diagram for explaining an operation of resolving overlaps between PUCCHs/PUSCHs according to an embodiment of the present disclosure.

FIG. 10 is a diagram for explaining an operation of resolving overlaps between PUCCHs/PUSCHs according to an embodiment of the present disclosure. Referring to FIG. 10, the UE first resolves overlaps between PUCCHs/PUSCHs with the same priority (B05). Thereafter, the UE resolves overlaps between PUCCHs with different priorities (B10). Then, the UE resolves overlaps between PUCCHs/PUSCHs of different priorities (in the same PUCCH group and the same band) (B15). As a result of performing the overlap resolution operation, the UE performs simultaneous transmission of PUCCHs/PUSCHs with different priorities on different bands, which are finally determined to be transmitted (B20).

2) Alt B

When a PUCCH and an A-CSI triggered PUSCH overlap in time, UCI in the corresponding PUCCH may be piggybacked on the corresponding A-CSI triggered PUSCH exceptionally, regardless of whether the two UL channels are on the same band (or cell) or different bands (or cells). If there is no A-CSI triggered PUSCH overlapping in time with the PUCCH, the operations in Alt A may be performed.

3) Alt C

When a PUSCH overlaps in time with a PUCCH on the same band (or cell), one PUSCH is selected from among all PUSCHs (on all bands (or cells) in the same PUCCH cell group), and then UCI in the PUCCH may be piggybacked on the corresponding PUSCH. On the other hand, when there is no PUSCH overlapping in time with a PUCCH on the same band (or cell) (if there is a PUSCH overlapping in time with the PUCCH on a different band (or cell)), simultaneous transmission of the PUCCH and PUSCH transmission may be performed (without UCI piggyback on the PUSCH).

[Proposal 3]

Additionally, (assuming that Inter-P_PUCCH_mux=Enable and/or Inter-P_PUSCH_mux=Enable are configured/indicated) when repetition transmission (across multiple slots or sub-slots) is configured/instructed for transmission of at least one of a LP channel (e.g., PUCCH or PUSCH) and a HP channel (e.g., PUCCH or PUSCH) (or when the repetition transmission is not configured/instructed for transmission of both the LP channel and HP channel), if LP channel resources and HP channel resources overlap in time, the following UE operations may be considered. In this case, if one of the LP channel and the HP channel is a PUCCH and the other is a PUSCH, the two channels may be on the same band (or cell) (within the same PUCCH cell group) (when PUCCH+PUSCH_TX=Enable is configured/indicated). Alternatively, the two channels may be on any cells (e.g., the same or different cells) (within the same PUCCH cell group) when PUCCH+PUSCH_TX=Disable is configured/indicated.

1) Case 1

A. When a non-repetition-based LP PUCCH carrying LP UCI (e.g., HARQ-ACK) and a non-repetition-based HP PUCCH carrying HP UCI (e.g., HARQ-ACK) overlap in time (while satisfying the UE processing timeline), the UE may be configured to multiplex and transmit the LP UCI and HP UCI on one specific PUCCH (e.g., HP PUCCH).

B. When the non-repetition-based LP PUCCH carrying the LP UCI and a non-repetition-based HP PUSCH overlap in time (while satisfying the UE processing timeline), the UE may be configured to multiplex and transmit the LP UCI on the HP PUSCH.

C. When the non-repetition-based HP PUCCH carrying the HP UCI and a non-repetition-based LP PUSCH overlap in time (while satisfying the UE processing timeline above), the UE may be configured to multiplex and transmit the HP UCI on the LP PUSCH.

D. When the non-repetition-based LP PUCCH carrying the LP UCI and a repetition-based HP PUSCH (e.g., one or more HP PUSCHs among multiple HP PUSCH resources forming the repetition) overlap in time (while satisfying the UE processing timeline), the UE may be configured to multiplex and transmit the LP UCI on the HP PUSCH (e.g., one specific HP PUSCH among the one or more HP PUSCHs overlapping with the LP PUCCH).

E. When the non-repetition-based HP PUCCH carrying the HP UCI and a repetition-based LP PUSCH (e.g., one or more LP PUSCHs among multiple LP PUSCH resources forming the repetition) overlap in time (while satisfying the UE processing timeline), the UE may be configured to multiplex and transmit the HP UCI on the LP PUSCH (e.g., one specific LP PUSCH among the one or more LP PUSCHs overlapping with the HP PUCCH).

2) Case 2

A. When a repetition-based LP PUCCH carrying LP UCI and a repetition-based HP PUCCH (or non-repetition-based HP PUCCH) carrying HP UCI overlap in time (while satisfying the UE processing timeline), the UE may be configured to transmit only the HP PUCCH (only on overlapping PUCCH resources or in a slot/sub-slot including the PUCCH resources) and drop transmission of the LP PUCCH (overlapping with the corresponding HP PUCCH).

B. When the repetition-based HP PUCCH carrying the HP UCI and the repetition-based LP PUCCH (or non-repetition-based LP PUCCH) carrying the LP UCI overlap in time (while satisfying the UE processing timeline), the UE may be configured to transmit only the HP PUCCH (only on overlapping PUCCH resources or in a slot/sub-slot including the PUCCH resources) and to drop transmission of the LP PUCCH (overlapping with the corresponding HP PUCCH).

C. When the repetition-based LP PUCCH carrying the LP UCI and a repetition-based HP PUSCH (or non-repetition-based HP PUSCH) overlap in time (while satisfying the UE processing timeline), the UE may be configured to transmit only the HP PUSCH (only on overlapping PUCCH and PUSCH resources or in a slot/sub-slot containing the PUCCH and PUSCH resources) and drop transmission of the LP PUCCH (overlapping with the corresponding HP PUSCH).

D. When the repetition-based HP PUCCH carrying the HP UCI and a repetition-based LP PUSCH (or non-repetition-based LP PUSCH) overlap in time (while satisfying the UE processing timeline), the UE may be configured to transmit only the HP PUCCH (only on overlapping PUCCH and PUSCH resources or in a slot/sub-slot including the PUCCH and PUSCH resources) and drop transmission of the LP PUSCH (overlapping with the corresponding HP PUCCH).

E. When the repetition-based LP PUSCH and the repetition-based HP PUSCH (or non-repetition-based HP PUSCH) overlap in time (while satisfying the UE processing timeline), the UE may be configured to transmit only the HP PUSCH (only on overlapping PUSCH resources or in a slot/sub-slot containing the PUSCH resources) and drop transmission of the LP PUSCH (overlapping with the corresponding HP PUSCH).

F. When the repetition-based HP PUSCH and the repetition-based LP PUSCH (or non-repetition-based LP PUSCH) overlap in time (while satisfying the UE processing timeline), the UE may be configured to transmit only the HP PUSCH (only on overlapping PUSCH resources or in a slot/sub-slot including the PUSCH resources) and drop transmission of the LP PUSCH (overlapping with the corresponding HP PUSCH).

In this document, a (frequency) band may mean that a plurality of cells belonging to a single PUCCH cell group are divided into one or more sub-groups and cells belonging to the same sub-group are in the same band (that is, cells belonging to different sub-groups are on different bands). Therefore, information on the sub-groups configured in one PUCCH cell group may be provided to the UE, and accordingly, the band in this document may be replaced with the sub-group.

Figure 11:
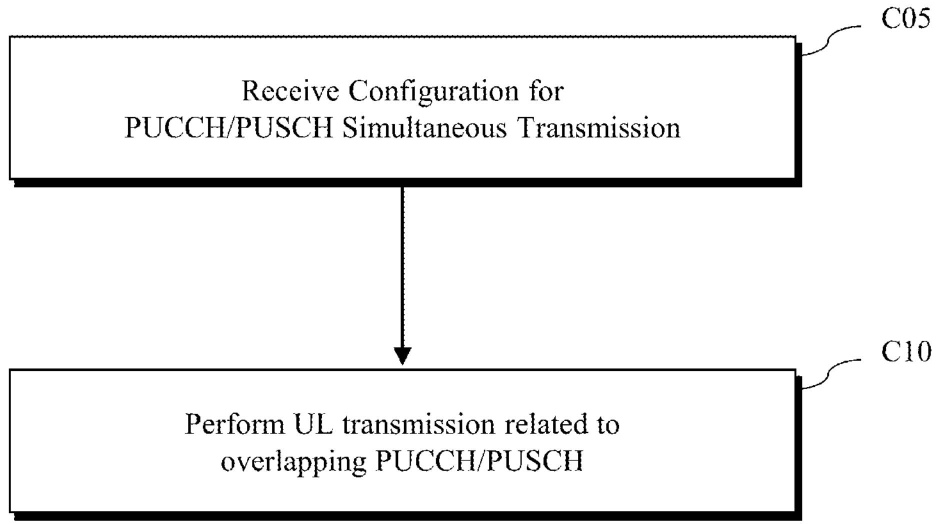
FIG. 11 illustrates an implementation example of a method by which a user equipment (UE) transmits a signal in a wireless communication system according to an embodiment of the present disclosure.

FIG. 11 illustrates an implementation example of a method by which a UE transmits a signal in a wireless communication system according to an embodiment of the present disclosure. FIG. 11 is for a better understanding of the above-described examples, and the scope of the present disclosure is not limited to the following description. The redundant description may be omitted, and the above-described content may be referred to if necessary.

Referring to FIG. 11, the UE may receive a parameter related to PUCCH-PUSCH simultaneous transmission (C05).

The parameter related to the PUCCH-PUSCH simultaneous transmission may be a parameter for enabling a simultaneous transmission of overlapping PUCCH-PUSCH with different priorities within a same PUCCH cell group, The UE may perform UL transmission related to at least one of a PUCCH and one or more PUSCHs overlapping with the PUCCH (C10).

The one or more PUSCHs overlapping with the PUCCH may include at least one of a first PUSCH on a first band to which a cell of the PUCCH belongs and a second PUSCH on a second band having at least one cell.

In a state where the simultaneous transmission of the overlapping PUCCH-PUSCH has been enabled, the UE may perform the UL transmission without multiplexing UCI in the PUCCH on the second PUSCH, based on that the first band to which the cell of the PUCCH belongs is different from the second band to which the cell of the second PUSCH belongs.

A priority of the PUCCH may be different from a priority of the second PUSCH. The cell of the PUCCH and the cell of the second PUSCH may belong to the same PUCCH cell group. The PUCCH and the second PUSCH may be transmitted simultaneously. The simultaneous transmission of the PUCCH and the second PUSCH may be based on inter-band CA.

When the UCI in the PUCCH is multiplexed into a PUSCH, the PUSCH may be determined as one of PUSCHs on the first band.

The simultaneous transmission of the PUCCH on the first band and the second PUSCH on the second band may be allowed based on the parameter, but multiplexing of the PUCCH on the first band and the second PUSCH on the second band may not be allowed.

Based on that the UE is configured with multiplexing between channels with different priorities and that a priority of the PUCCH is different from a priority of the first PUSCH, the UCI in the PUCCH may be transmitted through the first PUSCH other than the second PUSCH.

The UE may receive at least one of scheduling of the first PUSCH and DCI scheduling the second PUSCH over a PDCCH. The DCI may trigger A-CSI reporting and include a priority index of the corresponding PUSCH.

The UE may resolve an overlap between a PUCCH and a PUSCH with a same priority first, resolve an overlap between PUCCHs with different priorities, and then resolve an overlap between a PUCCH and a PUSCH with different priorities.

Figure 12:
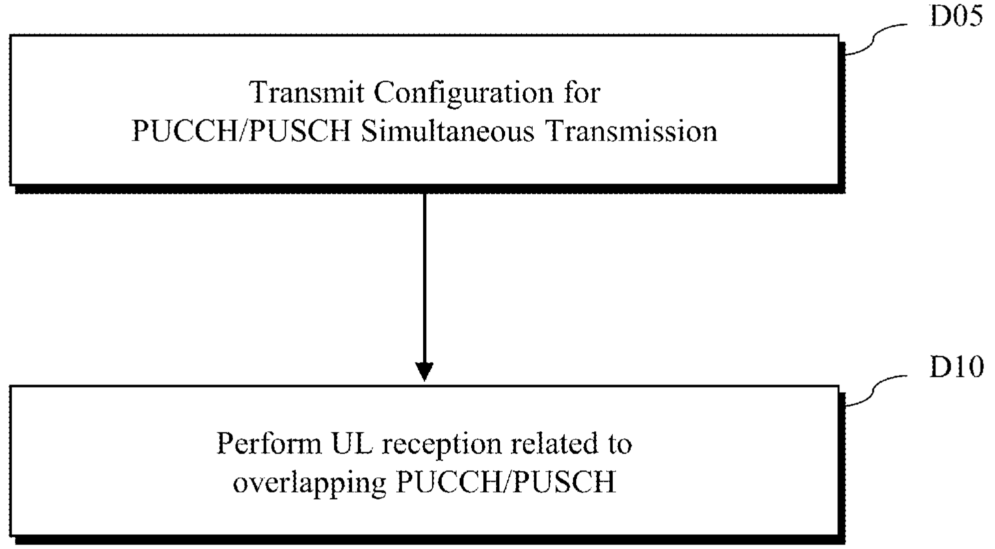
FIG. 12 illustrates an implementation example of a method by which a base station (BS) receives a signal in a wireless communication system according to an embodiment of the present disclosure.

FIG. 12 illustrates an implementation example of a method by which a BS receives a signal in a wireless communication system according to an embodiment of the present disclosure. FIG. 12 is for a better understanding of the above-described examples, and the scope of the present disclosure is not limited to the following description. The redundant description may be omitted, and the above-described content may be referred to if necessary.

Referring to FIG. 12, the BS may transmit a parameter related to PUCCH-PUSCH simultaneous transmission to a UE (D05).

The parameter related to the PUCCH-PUSCH simultaneous transmission may be a parameter for enabling the UE to perform simultaneous transmission of overlapping PUCCH-PUSCH with different priorities within a same PUCCH cell group.

The BS may receive a UL signal related to at least one of a PUCCH and one or more PUSCHs overlapping with the PUCCH from the UE (D10).

The one or more PUSCHs overlapping with the PUCCH may include at least one of a first PUSCH on a first band to which a cell of the PUCCH belongs and a second PUSCH on a second band having at least one cell.

In a state where the UE is enabled to perform the simultaneous transmission of the overlapping PUCCH-PUSCH, the BS may receive the UL signal without demultiplexing UCI in the PUCCH from the second PUSCH, based on that the first band to which the cell of the PUCCH belongs is different from the second band to which the cell of the second PUSCH belongs.

A priority of the PUCCH may be different from a priority of the second PUSCH. The cell of the PUCCH and the cell of the second PUSCH may belong to the same PUCCH cell group. The PUCCH and the second PUSCH may be received simultaneously. The simultaneous reception of the PUCCH and the second PUSCH may be based on inter-band CA.

When the UCI in the PUCCH is multiplexed into a PUSCH, the PUSCH may be determined as one of PUSCHs on the first band.

The simultaneous reception of the PUCCH on the first band and the second PUSCH on the second band may be performed based on the parameter, but multiplexing of the PUCCH on the first band and the second PUSCH on the second band may not be performed.

Based on that the BS configures to the UE multiplexing between channels with different priorities and that a priority of the PUCCH is different from a priority of the first PUSCH, the UCI in the PUCCH may be received over the first PUSCH other than the second PUSCH.

The BS may transmit at least one of scheduling of the first PUSCH and DCI scheduling the second PUSCH over a PDCCH. The DCI may trigger A-CSI reporting and include a priority index of the corresponding PUSCH.

Figure 13:
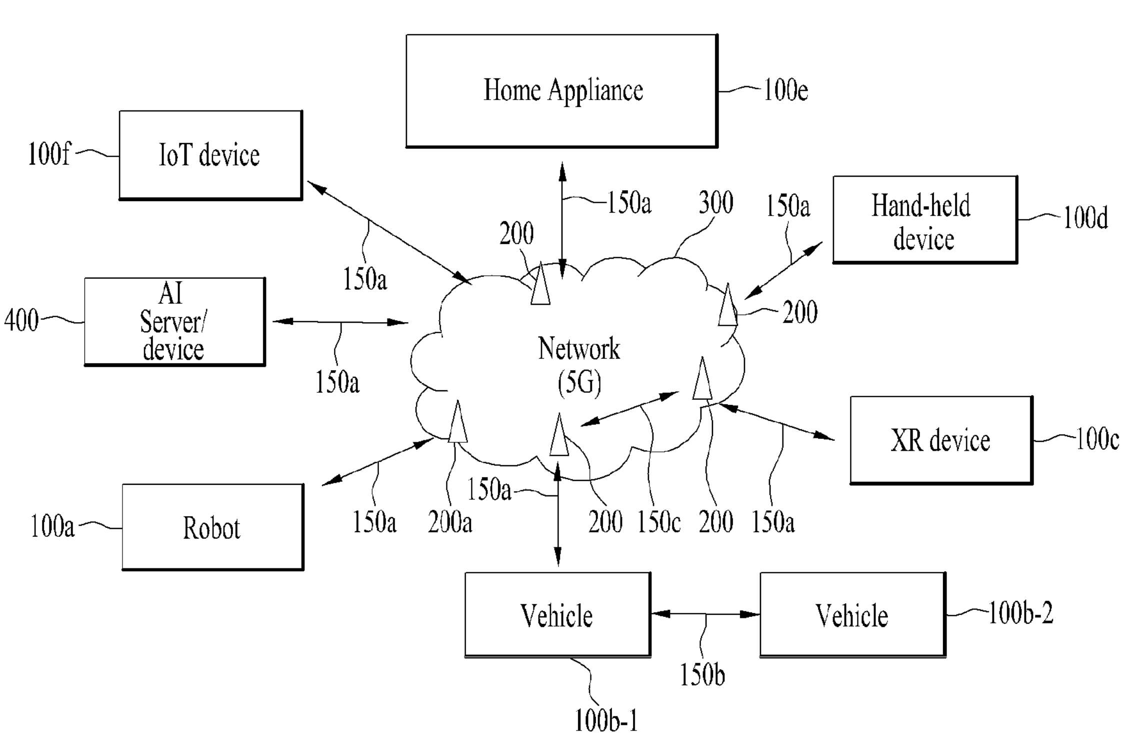
FIGS. 13 to 16 are diagrams illustrating an example of a communication system 1 and wireless devices applicable to the present disclosure.

FIG. 13 illustrates a communication system 1 applied to the present disclosure.

Referring to FIG. 13, a communication system 1 includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
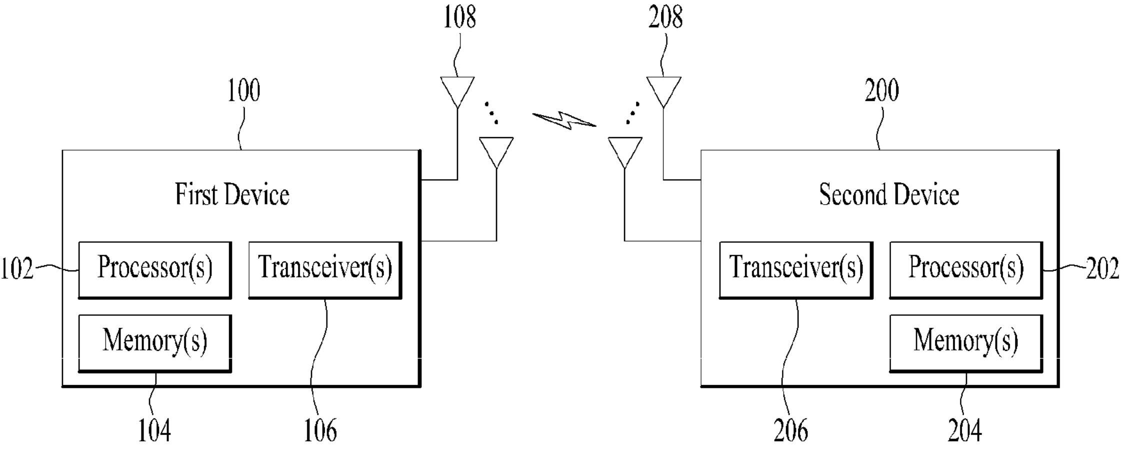

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
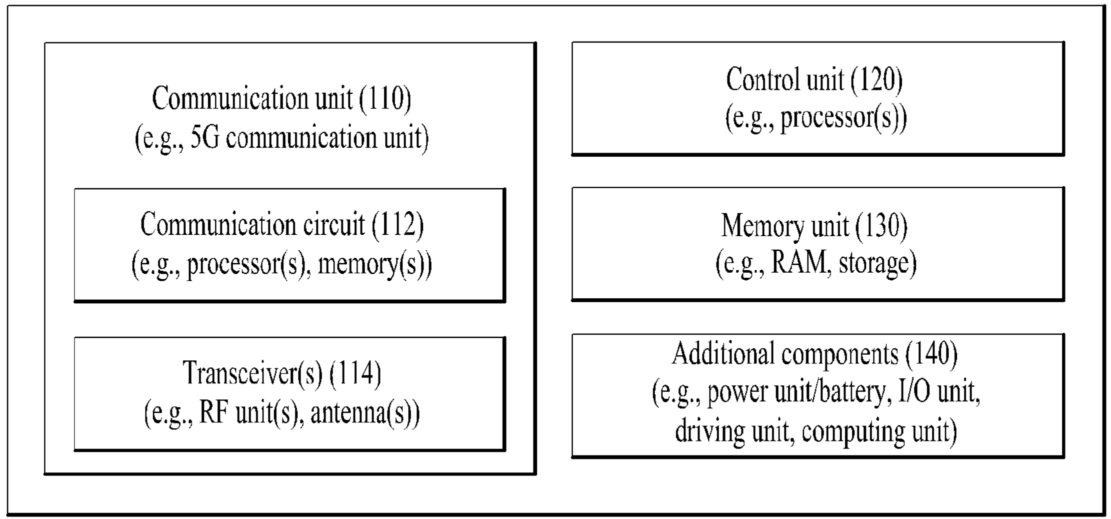

FIG. 15 illustrates another example of a wireless device applied to the present disclosure. The wireless device may be implemented in various forms according to a use-case/service (refer to FIG. 13).

Referring to FIG. 15, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 13), the vehicles (100*b*-1 and 100*b*-2 of FIG. 13), the XR device (100*c* of FIG. 13), the hand-held device (100*d* of FIG. 13), the home appliance (100*e* of FIG. 13), the IoT device (100*f* of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 16:
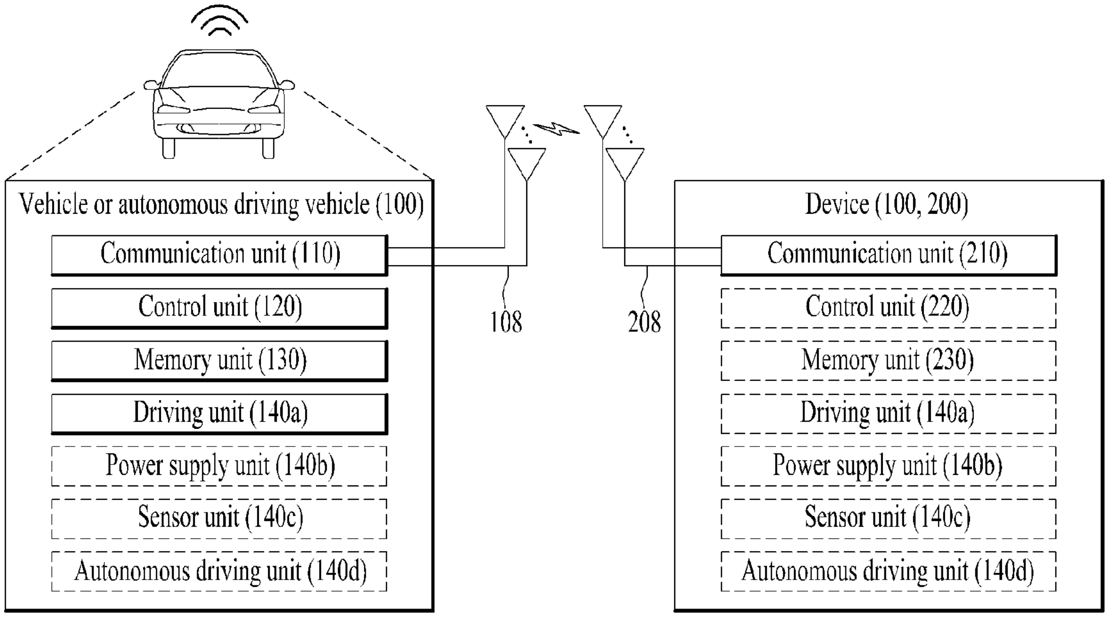

FIG. 16 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 16, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (PAIU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 17:
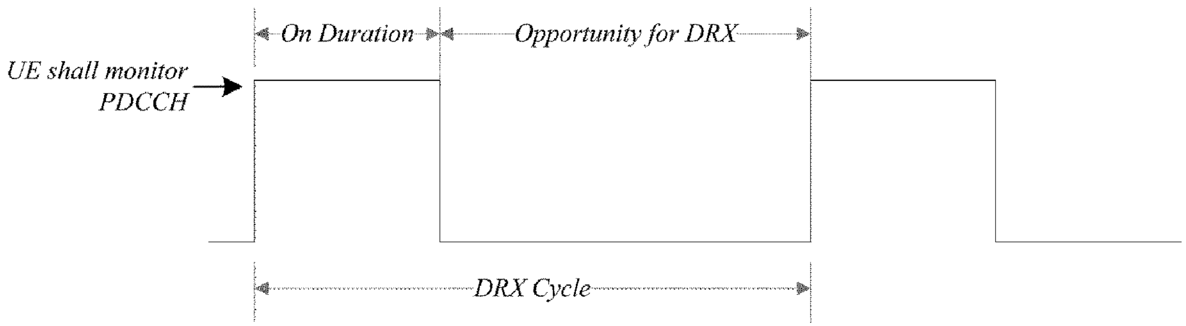
FIG. 17 is a diagram illustrating an example of a discontinuous reception (DRX) operation applicable to the present disclosure.

FIG. 17 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 17, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 10 describes a DRX operation of a UE (in the RRC_CONNECTED state). Referring to Table 10, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 10

| | Type of signals | UE procedure |
|---|---|---|
| 1st step | RRC signalling(MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method of transmitting a signal by a user equipment (UE) in a wireless communication system, the method comprising:

receiving a parameter related to a physical uplink control channel (PUCCH)-physical uplink shared channel (PUSCH) simultaneous transmission; and performing an uplink (UL) transmission related to at least one of a PUCCH and one or more PUSCHs overlapping with the PUCCH, wherein the parameter related to the PUCCH-PUSCH simultaneous transmission is a parameter for enabling a simultaneous transmission of overlapping PUCCH-PUSCH with different priorities within a same PUCCH cell group, wherein the one or more PUSCHs overlapping with the PUCCH include at least one of a first PUSCH on a first band to which a cell of the PUCCH belongs and a second PUSCH on a second band having at least one cell, and wherein, based on enabling of the simultaneous transmission of the overlapping PUCCH-PUSCH, the UE performs the UL transmission without multiplexing uplink control information (UCI) of the PUCCH into the second PUSCH, based on that the first band to which the cell of the PUCCH belongs is different from the second band to which the cell of the second PUSCH belongs.

2. The method of claim 1, wherein a priority of the PUCCH is different from a priority of the second PUSCH, wherein the cell of the PUCCH and the cell of the second PUSCH belong to the same PUCCH cell group, and wherein the PUCCH and the second PUSCH are transmitted simultaneously.

3. The method of claim 1, wherein based on that the UCI in the PUCCH is multiplexed into a PUSCH, the PUSCH is determined as one of PUSCHs on the first band.

4. The method of claim 1, wherein simultaneous transmission of the PUCCH on the first band and the second PUSCH on the second band is allowed based on the parameter, and wherein multiplexing of the PUCCH on the first band and the second PUSCH on the second band is not allowed.

5. The method of claim 1, wherein based on that the UE is configured with multiplexing between channels with different priorities and that a priority of the PUCCH is different from a priority of the first PUSCH, the UCI in the PUCCH is transmitted through the first PUSCH other than the second PUSCH.

6. The method of claim 2, wherein the simultaneous transmission of the PUCCH and the second PUSCH is based on inter-band carrier aggregation.

7. The method of claim 1, further comprising:

receiving at least one of downlink control information (DCI) for scheduling the first PUSCH or DCI for scheduling the second PUSCH through a physical downlink control channel (PDCCH).

8. The method of claim 7, wherein the at least one DCI triggers aperiodic channel state information (CSI) reporting and includes a priority index of the PUSCH.

9. The method of claim 1, wherein the UE resolves an overlap between a PUCCH and a PUSCH with a same priority first, resolves an overlap between PUCCHs with different priorities, and then resolves an overlap between a PUCCH and a PUSCH with different priorities.

10. A non-transitory computer-readable recording medium having recorded thereon a program for executing the method of claim 1.

11. A device for wireless communication, the device comprising:

a memory storing instructions; and a processor configured to perform operations by executing the instructions, wherein the operations of the processor comprising:

receiving a parameter related to a physical uplink control channel (PUCCH)-physical uplink shared channel (PUSCH) simultaneous transmission; and performing an uplink (UL) transmission related to at least one of a PUCCH and one or more PUSCHs overlapping with the PUCCH, wherein the parameter related to the PUCCH-PUSCH simultaneous transmission is a parameter for enabling a simultaneous transmission of overlapping PUCCH-PUSCH with different priorities within a same PUCCH cell group, wherein the one or more PUSCHs overlapping with the PUCCH include at least one of a first PUSCH on a first band to which a cell of the PUCCH belongs and a second PUSCH on a second band having at least one cell, and wherein, based on enabling of the simultaneous transmission of the overlapping PUCCH-PUSCH, the processor is configured to perform the UL transmission without multiplexing uplink control information (UCI) of the PUCCH into the second PUSCH, based on that the first band to which the cell of the PUCCH belongs is different from the second band to which the cell of the second PUSCH belongs.

12. The device of claim 11, further comprising:

a transceiver configured to transmit or receive a wireless signal under control of the processor, wherein the device is a user equipment (UE) in a wireless communication system.

13. The device of claim 11, wherein the device is an application-specific integrated circuit (ASIC) or a digital signal processor configured to control a user equipment (UE).

14. A method of receiving a signal by a base station (BS) in a wireless communication system, the method comprising:

transmitting a parameter related to a physical uplink control channel (PUCCH)-physical uplink shared channel (PUSCH) simultaneous transmission to a user equipment (UE); and receiving an uplink (UL) signal related to at least one of a PUCCH and one or more PUSCHs overlapping with the PUCCH from the UE, wherein the parameter related to the PUCCH-PUSCH simultaneous transmission is a parameter for enabling the UE to perform simultaneous transmission of overlapping PUCCH-PUSCH with different priorities within a same PUCCH cell group, wherein the one or more PUSCHs overlapping with the PUCCH include at least one of a first PUSCH on a first band to which a cell of the PUCCH belongs and a second PUSCH on a second band having at least one cell, and wherein, based on enabling of the simultaneous transmission of the overlapping PUCCH-PUSCH, the BS receives the UL signal without de-multiplexing uplink control information (UCI) in the PUCCH from the second PUSCH, based on that the first band to which the cell of the PUCCH belongs is different from the second band to which the cell of the second PUSCH belongs.

15. A base station (BS) for wireless communication, the BS comprising:

a transceiver; and a processor configured to control the transceiver to transmit a parameter related to a physical uplink control channel (PUCCH)-physical uplink shared channel (PUSCH) simultaneous transmission to a user equipment (UE), and to receive an uplink (UL) signal related to at least one of a PUCCH and one or more PUSCHs overlapping with the PUCCH from the UE, wherein the parameter related to the PUCCH-PUSCH simultaneous transmission is a parameter for enabling the UE to perform simultaneous transmission of overlapping PUCCH-PUSCH with different priorities within a same PUCCH cell group, wherein the one or more PUSCHs overlapping with the PUCCH include at least one of a first PUSCH on a first band to which a cell of the PUCCH belongs and a second PUSCH on a second band having at least one cell, and wherein, based on enabling of the simultaneous transmission of the overlapping PUCCH-PUSCH, the processor is configured to receive the UL signal without de-multiplexing uplink control information (UCI) in the PUCCH from the second PUSCH, based on that the first band to which the cell of the PUCCH belongs is different from the second band to which the cell of the second PUSCH belongs.

* * * * *